(12) United States Patent
Van Dyke et al.

(10) Patent No.: US 11,945,048 B2
(45) Date of Patent: Apr. 2, 2024

(54) LASER-BASED CUTTING OF TRANSPARENT COMPONENTS FOR AN ELECTRONIC DEVICE

(71) Applicant: Apple Inc., Cupertino, CA (US)

(72) Inventors: Matthew N. Van Dyke, San Francisco, CA (US); Michael M. Li, San Jose, CA (US); Thomas Johannessen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/559,129

(22) Filed: Dec. 22, 2021

(65) Prior Publication Data

US 2022/0193825 A1 Jun. 23, 2022

Related U.S. Application Data

(60) Provisional application No. 63/130,017, filed on Dec. 23, 2020.

(51) Int. Cl.
*H05K 5/00* (2006.01)
*B23K 26/362* (2014.01)

(52) U.S. Cl.
CPC ......... *B23K 26/362* (2013.01); *H05K 5/0017* (2013.01)

(58) Field of Classification Search
CPC ............................ H05K 5/0017; H05K 5/0217
USPC ........ 361/807, 728, 752, 796, 800, 809, 810
See application file for complete search history.

(56) References Cited

U.S. PATENT DOCUMENTS

| | | | |
|---|---|---|---|
| 2,795,084 A | 6/1957 | Littleton | |
| 3,410,673 A | 11/1968 | Marusak | |
| 3,433,611 A | 3/1969 | Kubican | |
| 3,464,880 A | 9/1969 | Rinehart | |
| 3,737,294 A | 6/1973 | Dumbaugh, Jr. et al. | |
| 3,746,526 A | 7/1973 | Giffon | |
| 3,899,315 A | 8/1975 | Siegmund | |
| 4,054,895 A | 10/1977 | Ham et al. | |
| 4,070,211 A | 1/1978 | Haran et al. | |
| 4,209,229 A | 6/1980 | Rittler | |
| 4,339,300 A | 7/1982 | Noble et al. | |
| 4,735,917 A | 4/1988 | Flatley et al. | |
| 4,849,299 A | 7/1989 | Loth et al. | |
| 5,122,177 A | 6/1992 | Yoshizama et al. | |

(Continued)

FOREIGN PATENT DOCUMENTS

| | | |
|---|---|---|
| CN | 101475300 | 7/2009 |
| CN | 103986803 | 8/2013 |

(Continued)

OTHER PUBLICATIONS

Author Unknown, "Handbook for Interior Designers," 3 pages, 1998.

(Continued)

*Primary Examiner* — Hung S. Bui
(74) *Attorney, Agent, or Firm* — Brownstein Hyatt Farber Schreck, LLP

(57) ABSTRACT

Laser-based techniques for cutting and drilling of transparent components are disclosed. These laser-based techniques rely on laser modification of transparent substrates followed by chemical etching and are suitable for use with a variety of transparent substrates. Transparent components and enclosures and electronic devices including the transparent components are also disclosed herein.

20 Claims, 15 Drawing Sheets

(56) References Cited

U.S. PATENT DOCUMENTS

| | | |
|---|---|---|
| 5,173,453 A | 12/1992 | Beall et al. |
| 5,273,553 A | 12/1993 | Hoshi et al. |
| 6,055,053 A | 4/2000 | Lesniak |
| 6,067,005 A | 5/2000 | DeVolpi |
| 6,169,256 B1 | 1/2001 | Hanahara |
| 6,406,769 B1 | 6/2002 | Delabre et al. |
| 6,809,278 B2 | 10/2004 | Tsubaki |
| 6,928,224 B2 | 8/2005 | Beall et al. |
| 7,115,827 B2 | 10/2006 | Tseng |
| 7,166,909 B2 | 1/2007 | Moriaga et al. |
| 7,240,519 B2 | 7/2007 | Schwartz et al. |
| 7,459,199 B2 | 12/2008 | Skeen |
| 7,497,093 B2 | 3/2009 | Rosenflanz |
| 7,507,918 B2 | 3/2009 | Kazama |
| 7,799,158 B2 | 9/2010 | Yokoyama et al. |
| 7,902,474 B2 | 3/2011 | Mittleman |
| 7,915,556 B2 | 3/2011 | Ou |
| 7,943,953 B2 | 5/2011 | Sakamoto et al. |
| 7,966,785 B2 | 6/2011 | Zadesky et al. |
| 8,003,217 B2 | 8/2011 | Rosenflanz |
| 8,050,019 B2 | 11/2011 | Wennemer |
| 8,092,737 B2 | 1/2012 | Chang et al. |
| 8,212,455 B2 | 7/2012 | Yura et al. |
| 8,277,704 B2 | 10/2012 | Matsushima et al. |
| 8,379,159 B2 | 2/2013 | Hsu |
| 8,431,849 B2 | 4/2013 | Chen |
| 8,446,264 B2 | 5/2013 | Tanase |
| 8,665,160 B2 | 3/2014 | Uttermann et al. |
| 8,717,513 B2 | 5/2014 | Park et al. |
| 8,783,065 B2 | 7/2014 | Schillert et al. |
| 8,840,997 B2 | 9/2014 | Koyama et al. |
| 8,898,824 B2 | 12/2014 | Neidich et al. |
| 9,001,503 B1 | 4/2015 | Hibino |
| 9,030,440 B2 | 5/2015 | Pope |
| 9,069,198 B2 | 6/2015 | Kim et al. |
| 9,110,230 B2 | 8/2015 | Koch, III et al. |
| 9,125,298 B2 | 9/2015 | Russell-Clarke |
| 9,134,547 B2 | 9/2015 | McCabe et al. |
| 9,140,522 B1 | 9/2015 | Miller et al. |
| 9,154,678 B2 | 10/2015 | Kwong et al. |
| 9,193,625 B2 | 11/2015 | Bookbinder et al. |
| 9,232,672 B2 | 1/2016 | Kwong |
| 9,242,889 B2 | 1/2016 | Yamakaji et al. |
| 9,249,045 B2 | 2/2016 | Gabel et al. |
| 9,263,209 B2 | 2/2016 | Chen |
| 9,302,937 B2 | 4/2016 | Gulati et al. |
| 9,321,677 B2 | 4/2016 | Chang et al. |
| 9,359,251 B2 | 6/2016 | Bookbinder et al. |
| 9,375,900 B2 | 6/2016 | Tsuchiya et al. |
| 9,390,930 B2 | 7/2016 | Rogers et al. |
| 9,392,706 B2 | 7/2016 | Yoo et al. |
| 9,429,997 B2 | 8/2016 | Myers et al. |
| 9,474,174 B2 | 10/2016 | Motohashi |
| 9,516,149 B2 | 12/2016 | Wright et al. |
| 9,522,836 B2 | 12/2016 | Gulati et al. |
| 9,524,413 B2 | 12/2016 | Kim |
| 9,632,537 B2 | 4/2017 | Memering et al. |
| 9,674,322 B2 | 6/2017 | Motohashi et al. |
| 9,678,540 B2 | 6/2017 | Memering et al. |
| 9,697,409 B2 | 7/2017 | Myers |
| 9,718,727 B2 | 8/2017 | Bookbinder et al. |
| 9,728,349 B2 | 8/2017 | Huang |
| 9,840,435 B2 | 12/2017 | Ohara et al. |
| 9,846,473 B1 | 12/2017 | Kalscheur et al. |
| 9,870,880 B2 | 1/2018 | Zercoe |
| 9,890,074 B2 | 2/2018 | Liu |
| 9,897,574 B2 | 2/2018 | Roussev et al. |
| 9,902,138 B2 | 2/2018 | Edwards |
| 9,902,641 B2 | 2/2018 | Hall et al. |
| 9,941,074 B2 | 4/2018 | Tu |
| 9,946,302 B2 | 4/2018 | Franklin et al. |
| 9,963,374 B2 | 5/2018 | Jouanno et al. |
| 10,133,156 B2 | 11/2018 | Pilliod et al. |
| 10,141,133 B2 | 11/2018 | Bae |
| 10,146,982 B2 | 12/2018 | Hsu |
| 10,189,228 B2 | 1/2019 | Couillard et al. |
| 10,206,298 B2 | 2/2019 | Memering et al. |
| 10,286,631 B2 | 5/2019 | Alder et al. |
| 10,318,783 B2 | 6/2019 | Kang |
| 10,324,496 B2 | 6/2019 | Kwong et al. |
| 10,357,945 B2 | 7/2019 | Beall et al. |
| 10,425,994 B2 | 9/2019 | Weiss et al. |
| 10,494,860 B1 | 12/2019 | Jones et al. |
| 10,513,455 B2 | 12/2019 | Cook et al. |
| 10,611,666 B2 | 4/2020 | Jones et al. |
| 10,694,010 B2 | 6/2020 | Jones et al. |
| 10,702,211 B2 | 7/2020 | Clavelle et al. |
| 10,800,141 B2 | 10/2020 | Bartlow et al. |
| 10,827,635 B1 | 11/2020 | Limarga et al. |
| 10,875,277 B2 | 12/2020 | Aoki et al. |
| 10,899,660 B2 | 1/2021 | Luzzato et al. |
| 10,917,505 B2 | 2/2021 | Jones et al. |
| 10,919,270 B2 | 2/2021 | Oh et al. |
| 10,986,744 B2 | 4/2021 | Yeum et al. |
| 11,066,322 B2 | 7/2021 | Jones et al. |
| 11,109,500 B2 | 8/2021 | Shannon et al. |
| 11,192,823 B2 | 12/2021 | Li et al. |
| 11,199,929 B2 | 12/2021 | Poole et al. |
| 11,419,231 B1 | 8/2022 | Lancaster-Larocque et al. |
| 2003/0040346 A1 | 2/2003 | Fukuda et al. |
| 2003/0062490 A1 | 4/2003 | Fujieda |
| 2004/0003627 A1 | 1/2004 | Hashima |
| 2004/0041504 A1 | 3/2004 | Ozolins |
| 2004/0105026 A1 | 6/2004 | Campbell et al. |
| 2005/0135724 A1 | 6/2005 | Helvajian |
| 2005/0176506 A1 | 8/2005 | Goto |
| 2008/0049980 A1 | 2/2008 | Castaneda |
| 2008/0316687 A1 | 12/2008 | Richardson et al. |
| 2009/0040737 A1 | 2/2009 | Shimura |
| 2009/0104409 A1 | 4/2009 | Derriey |
| 2010/0013786 A1 | 1/2010 | Nishikawa et al. |
| 2010/0108486 A1 | 5/2010 | Yoshida |
| 2010/0127420 A1 | 5/2010 | Dannoux |
| 2010/0148996 A1 | 6/2010 | Wang |
| 2010/0263708 A1 | 10/2010 | Reichart et al. |
| 2010/0279068 A1 | 11/2010 | Cook et al. |
| 2010/0285310 A1 | 11/2010 | Izutani et al. |
| 2010/0330814 A1 | 12/2010 | Yokota |
| 2011/0019123 A1 | 1/2011 | Prest et al. |
| 2011/0019354 A1 | 1/2011 | Prest et al. |
| 2011/0038115 A1 | 2/2011 | Halkosaari |
| 2011/0041987 A1 | 2/2011 | Hori et al. |
| 2011/0177300 A1 | 7/2011 | Hankey et al. |
| 2011/0253520 A1 | 10/2011 | Lim |
| 2012/0052271 A1 | 3/2012 | Gomez et al. |
| 2012/0176760 A1 | 7/2012 | Cohen et al. |
| 2012/0206669 A1 | 8/2012 | Kim |
| 2012/0212890 A1 | 8/2012 | Hoshino et al. |
| 2012/0229424 A1 | 9/2012 | Behies et al. |
| 2012/0236526 A1 | 9/2012 | Weber |
| 2012/0250273 A1 | 10/2012 | Kuo |
| 2012/0327325 A1 | 12/2012 | Park et al. |
| 2013/0128434 A1 | 5/2013 | Yamamoto et al. |
| 2013/0236699 A1 | 9/2013 | Prest et al. |
| 2014/0093702 A1 | 4/2014 | Kitajima |
| 2014/0116090 A1 | 5/2014 | Lee et al. |
| 2014/0151320 A1 | 6/2014 | Chang et al. |
| 2014/0272298 A1 | 9/2014 | Memering et al. |
| 2014/0285956 A1 | 9/2014 | Russell-Clarke et al. |
| 2014/0311882 A1 | 10/2014 | Terashita |
| 2015/0002993 A1 | 1/2015 | Lee |
| 2015/0030834 A1 | 1/2015 | Morey et al. |
| 2015/0030859 A1 | 1/2015 | Rogers et al. |
| 2015/0044445 A1 | 2/2015 | Garner et al. |
| 2015/0077830 A1 | 3/2015 | Lin et al. |
| 2015/0093581 A1 | 4/2015 | Murata et al. |
| 2015/0104618 A1 | 4/2015 | Hayashi et al. |
| 2015/0122406 A1 | 5/2015 | Fisher et al. |
| 2015/0163382 A1 | 6/2015 | Kwong et al. |
| 2015/0165548 A1 | 6/2015 | Marjanovic et al. |
| 2015/0202854 A1 | 7/2015 | Tsuchiya et al. |
| 2015/0210588 A1 | 7/2015 | Chang et al. |
| 2015/0212247 A1 | 7/2015 | Borrelli et al. |
| 2015/0232366 A1 | 8/2015 | Fredholm et al. |

(56) References Cited

U.S. PATENT DOCUMENTS

| | | |
|---|---|---|
| 2015/0241732 A1 | 8/2015 | Kim et al. |
| 2015/0245514 A1 | 8/2015 | Choung |
| 2015/0274572 A1 | 10/2015 | Wada et al. |
| 2015/0299036 A1 | 10/2015 | Ukrainczyk et al. |
| 2016/0028931 A1 | 1/2016 | Kwong et al. |
| 2016/0137550 A1 | 5/2016 | Murata et al. |
| 2016/0224142 A1 | 8/2016 | Yang et al. |
| 2016/0270247 A1 | 9/2016 | Jones et al. |
| 2016/0357294 A1 | 12/2016 | Czeki et al. |
| 2016/0377768 A1 | 12/2016 | Wilson et al. |
| 2017/0027068 A1 | 1/2017 | Dane et al. |
| 2017/0059749 A1 | 3/2017 | Wakatsuki et al. |
| 2017/0066223 A1 | 3/2017 | Notsu et al. |
| 2017/0282503 A1 | 10/2017 | Peng et al. |
| 2017/0300114 A1 | 10/2017 | Matsuyuki et al. |
| 2017/0305788 A1 | 10/2017 | Nikulin |
| 2017/0334770 A1 | 11/2017 | Luzzato et al. |
| 2017/0340518 A1 | 11/2017 | Logunov et al. |
| 2017/0364172 A1 | 12/2017 | Kim et al. |
| 2018/0009697 A1 | 1/2018 | He et al. |
| 2018/0024274 A1 | 1/2018 | Rogers et al. |
| 2018/0067212 A1 | 3/2018 | Wilson et al. |
| 2018/0086026 A1 | 3/2018 | Nguyen et al. |
| 2018/0086663 A1 | 3/2018 | Luzzato et al. |
| 2018/0088399 A1 | 3/2018 | Fukushi et al. |
| 2018/0125756 A1 | 5/2018 | Gerrish et al. |
| 2018/0126704 A1 | 5/2018 | Zhang et al. |
| 2018/0134606 A1 | 5/2018 | Wagner et al. |
| 2018/0154615 A1 | 6/2018 | Dohn et al. |
| 2018/0237325 A1 | 8/2018 | Li et al. |
| 2018/0282207 A1 | 10/2018 | Fujii et al. |
| 2018/0304588 A1 | 10/2018 | Harris et al. |
| 2018/0304825 A1 | 10/2018 | Mattelet et al. |
| 2018/0326704 A1 | 11/2018 | Harris et al. |
| 2018/0370843 A1 | 12/2018 | Gross et al. |
| 2019/0022979 A1 | 1/2019 | Luzzato et al. |
| 2019/0030861 A1 | 1/2019 | Bellman et al. |
| 2019/0033144 A1 | 1/2019 | Andrews et al. |
| 2019/0037690 A1 | 1/2019 | Wilson et al. |
| 2019/0134944 A1 | 5/2019 | Dawson-Elli |
| 2019/0160787 A1 | 5/2019 | Bartlow et al. |
| 2019/0161402 A1 | 5/2019 | Harris et al. |
| 2019/0177215 A1 | 6/2019 | Jin et al. |
| 2019/0219463 A1 | 7/2019 | Orihara et al. |
| 2019/0263708 A1 | 8/2019 | Bookbinder et al. |
| 2019/0293838 A1 | 9/2019 | Haba et al. |
| 2020/0014780 A1 | 1/2020 | Jones et al. |
| 2020/0039186 A1 | 2/2020 | Yuan et al. |
| 2020/0055281 A1 | 2/2020 | Yoon et al. |
| 2020/0095159 A1 | 3/2020 | Marshall et al. |
| 2020/0301527 A1 | 9/2020 | Poole et al. |
| 2020/0323440 A1 | 10/2020 | Vule et al. |
| 2020/0339472 A1 | 10/2020 | Yoon et al. |
| 2020/0346525 A1 | 11/2020 | Mannheim Astete et al. |
| 2020/0369560 A1 | 11/2020 | Takeda et al. |
| 2020/0379143 A1* | 12/2020 | Gu .................. G02B 1/18 |
| 2020/0389991 A1 | 12/2020 | Shannon et al. |
| 2020/0407266 A1 | 12/2020 | Suzuki et al. |
| 2021/0009469 A1 | 1/2021 | Marshall et al. |
| 2021/0014992 A1 | 1/2021 | Limarga et al. |
| 2021/0016547 A1 | 1/2021 | Bartlow et al. |
| 2021/0033757 A1 | 2/2021 | Wilson et al. |
| 2021/0072789 A1 | 3/2021 | Rogers et al. |
| 2021/0212229 A1 | 7/2021 | Yeum et al. |
| 2021/0303031 A1 | 9/2021 | Poole et al. |
| 2021/0361233 A1 | 11/2021 | Wilson et al. |
| 2022/0009823 A1 | 1/2022 | Dejneka et al. |
| 2022/0117094 A1 | 4/2022 | Prest et al. |
| 2022/0194840 A1 | 6/2022 | Meschke et al. |
| 2022/0194841 A1 | 6/2022 | Meschke et al. |
| 2023/0014168 A1 | 1/2023 | Poole et al. |

FOREIGN PATENT DOCUMENTS

| | | |
|---|---|---|
| CN | 105765722 | 7/2016 |
| CN | 106007345 | 10/2016 |
| CN | 106341962 | 1/2017 |
| CN | 106485275 | 3/2017 |
| CN | 108017263 | 5/2018 |
| CN | 108285263 | 7/2018 |
| CN | 108545917 | 9/2018 |
| CN | 108600419 | 9/2018 |
| CN | 108632510 | 10/2018 |
| CN | 110857865 | 3/2020 |
| CN | 111655478 | 9/2020 |
| CN | 215010334 | 12/2021 |
| DE | 102016107630 | 10/2017 |
| JP | S6042176 | 9/1985 |
| JP | S6271215 | 5/1987 |
| JP | H03122036 | 5/1991 |
| TW | 201912602 | 4/2019 |
| WO | WO2010/077845 | 7/2010 |
| WO | WO2012/027660 | 3/2012 |
| WO | WO2012/074983 | 6/2012 |
| WO | WO2014/022356 | 2/2014 |
| WO | WO2014/022681 | 2/2014 |
| WO | WO2015/031420 | 3/2015 |
| WO | WO2015/095089 | 6/2015 |
| WO | WO2016/065118 | 4/2016 |
| WO | WO2017/196800 | 11/2017 |
| WO | WO2019/199791 | 10/2019 |
| WO | WO2019213364 | 11/2019 |

OTHER PUBLICATIONS

U.S. Appl. No. 17/951,393, filed Sep. 23, 2022, pending.
Aben et al., "A New Method for Tempering Stress Measurement in Glass Panels," Estonian Journal of Engineering, vol. 19, No. 4, pp. 292-297, 2013.
Bourhis, "Production Control of Residual Stresses," Glass Mechanics and Technology, Second Edition, pp. 236-243, 2014.
Decourcelle, et al., "Controlling Anisotropy," Conference Proceedings, All Eyes on Glass, Glass Performance Days, Tampere, Finland, Jun. 28-30, 2017.
Dudutis et al., Bessel beam asymmetry control for glass dicing applications, Procedia CIRP 74, pp. 333-338, 2018.
Gottmann et al., "Microcutting and Hollow 3D Microstructures in Glasses by In-Volume Selective Laser-induced Etching," Journal of Laser Micro / Nanoengineering, vol. 8, No. 1, pp. 15-18, Jan. 2013.
Jenne et al., "High-quality Tailored-edge Cleaving Using Aberration-corrected Bessel-like Beams," arXiv:2010.10226v1 [physics.optics], May 8, 2018.
Mao et al., "Fabrication and characterization of 20 nm planar nanofluidic channels by glass-glass and glass-silicon bonding," www.rsc.org/loc, 8 pages, Jun. 30, 2005.
Moriceau et al., "Overview of recent direct wafer bonding advances and applications," Advances in Natural Sciences: Nanoscience and Nanotechnology, vol. 1, No. 043004, 11 pages, 2010.
Ungaro et al., "Using phase-corrected Bessel beams to cut glass substrates with a chamfered edge," Applied Optics, vol. 60, No. 3, p. 714, Dec. 10, 2020.
U.S. Appl. No. 15/886,203, filed Feb. 1, 2018, pending.
U.S. Appl. No. 16/879,403, filed May 20, 2020, pending.
U.S. Appl. No. 17/553,105, filed Dec. 16, 2021, pending.
U.S. Appl. No. 17/553,228, filed Dec. 16, 2021, pending.
Author Unknown, "Monolithic," definition of monolithic by Merriam-Webster, 3 pages, Sep. 6, 2015.

* cited by examiner

LASER-BASED CUTTING OF TRANSPARENT COMPONENTS FOR AN ELECTRONIC DEVICE

CROSS-REFERENCE TO RELATED APPLICATION(S)

This application is a nonprovisional application of and claims the benefit of U.S. Provisional Patent Application No. 63/130,017, filed Dec. 23, 2020 and titled "Laser-Based Cutting of Transparent Components for an Electronic Device," the disclosure of which is hereby incorporated by reference in its entirety.

FIELD

The described embodiments relate generally to laser-based modification of transparent materials. Particular embodiments relate to laser-based cutting methods which can produce transparent components having a faceted or rounded edge profile.

BACKGROUND

Some traditional methods for cutting glass involve scribing and breaking a glass sheet. The cut edges of the glass sheet may then be ground and polished. The techniques and articles described herein are directed to laser-based methods for cutting glass and other transparent components.

SUMMARY

Laser-based techniques for cutting and drilling of transparent components are disclosed herein. These techniques rely on laser modification of transparent substrates followed by chemical etching. The techniques are suitable for use with a variety of transparent substrates, including transparent substrates formed from glass or glass ceramic materials. Transparent components and enclosures and electronic devices including the transparent components are also disclosed herein.

Some of the techniques described herein can be used to separate a transparent component with a shaped edge profile from a larger substrate. For example, the shaped edge profile may be faceted or include one or more curves. Additional techniques described herein can be used to form through-holes, blind-holes, or other features in the transparent component.

As described herein, laser modification of the transparent substrate creates a set of laser-formed features within the transparent substrate. Etching a region of the transparent substrate that includes the laser-formed features can form a hole, a slot, or other opening in the transparent substrate. In some examples, the opening is a kerf used to separate a transparent component from a remainder of the transparent substrate. In some cases, the techniques described herein may strengthen an edge surface of the transparent component as compared to an edge surface produced by a mechanical separation technique.

In some embodiments, one or more laser modification operations use a laser system which produces a beam that comprises a focal segment defined by an elongated core of light. The laser system may scan the beam along a path. The focal segment of the beam may extend into the transparent substrate and create the laser-formed features. The orientation and the length of the focal segment(s) can be configured to precisely control the size and shape of an opening formed in the transparent substrate. In some cases, the focal segment and the laser-formed features may define an oblique angle with respect to a surface of the transparent substrate.

The disclosure provides a method for making a transparent component for an electronic device, the method comprising modifying a transparent substrate using a laser system. The operation of modifying the transparent substrate comprises scanning a first focal segment of a first beam along a first path to create a first set of laser-formed features within the transparent substrate, the first set of laser-formed features at a first oblique angle with respect to a rear surface of the transparent substrate, scanning a second focal segment, different from the first focal segment, of a second beam along a second path to create a second set of laser-formed features within the transparent substrate, the second set of laser-formed features at a substantially perpendicular angle with respect to the rear surface, and scanning a third focal segment of a third beam, different from the second focal segment, along a third path, to create a third set of laser-formed features within the transparent substrate and at a second oblique angle with respect to a front surface of the transparent substrate. The method further comprises exposing the transparent substrate to an etchant to form the transparent component, the etchant separating the transparent component from a remainder of the transparent substrate along the first, second, and third sets of laser-formed features, the transparent component having a rear chamfer facet defined by the first set of laser-formed features and a front chamfer facet defined by the third set of laser-formed features.

In addition, the disclosure provides a method for making a transparent component for an electronic device, the method comprising pulsing a first focal segment of a first laser beam along a first closed path on a transparent substrate to create a first set of laser-formed features having a first depth that extends through the transparent substrate, pulsing a second focal segment of a second laser beam along a second closed path on the transparent substrate to create a second set of laser-formed features that extends to a second depth that is less than a thickness of the transparent substrate, and pulsing a third focal segment of a third laser beam along a third closed path on the transparent substrate to create a third set of laser-formed features that extends to a third depth that is less than the second depth. The method further comprises forming a shaped edge surface of the transparent component by etching a region of the transparent substrate comprising the first, second, and third sets of laser-formed features and subsequent to etching the region of the transparent substrate, removing the transparent component from a surrounding portion of the transparent substrate.

The disclosure further provides an electronic device comprising a display and an enclosure comprising a transparent component provided over the display, the transparent component comprising a front surface, a rear surface, and an edge surface extending between the front surface and the rear surface, the edge surface defining multiple facets and a surface texture comprising recessed features having a characteristic feature size from 25 nm to less than 1 micron. The electronic device further comprises an enclosure component coupled to the transparent component and at least partly defining an internal cavity of the electronic device, the display positioned at least partially within the internal cavity.

BRIEF DESCRIPTION OF THE DRAWINGS

The disclosure will be readily understood by the following detailed description in conjunction with the accompanying drawings, wherein like reference numerals designate like elements.

Figure 1A:
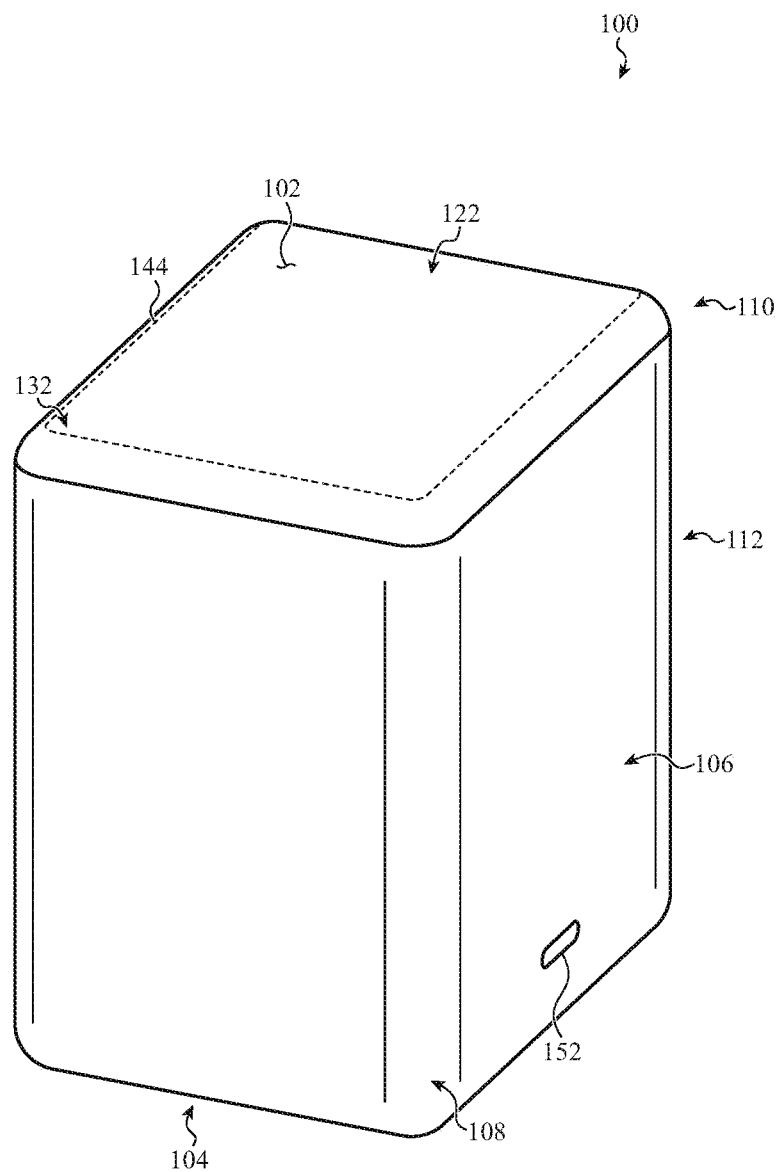
FIG. 1A depicts an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to laser-based techniques for cutting and/or drilling of transparent substrates. The techniques disclosed herein rely on laser modification of the transparent substrates followed by chemical etching. The techniques are suitable for use with a variety of transparent substrates, including transparent substrates formed from glass or glass ceramic materials. In some cases, the transparent substrate is a component for an electronic device. Transparent components and enclosures and electronic devices including the transparent components are also disclosed herein.

Laser modification of the transparent substrate as described herein creates a set of laser-formed features within the transparent substrate. Without wishing to be bound by theory, the region of the transparent substrate including the laser-formed features may etch more quickly than adjacent regions of the substrate. Etching the region of the transparent substrate that includes the laser-formed features can form a hole, a slot, or other opening in the transparent substrate. In some cases, the opening may be a kerf and the transparent substrate may be separated into multiple pieces following the etching operation. In additional cases, the etching process may remove enough of the substrate so that the transparent substrate may be separated into multiple pieces.

Figure 5:
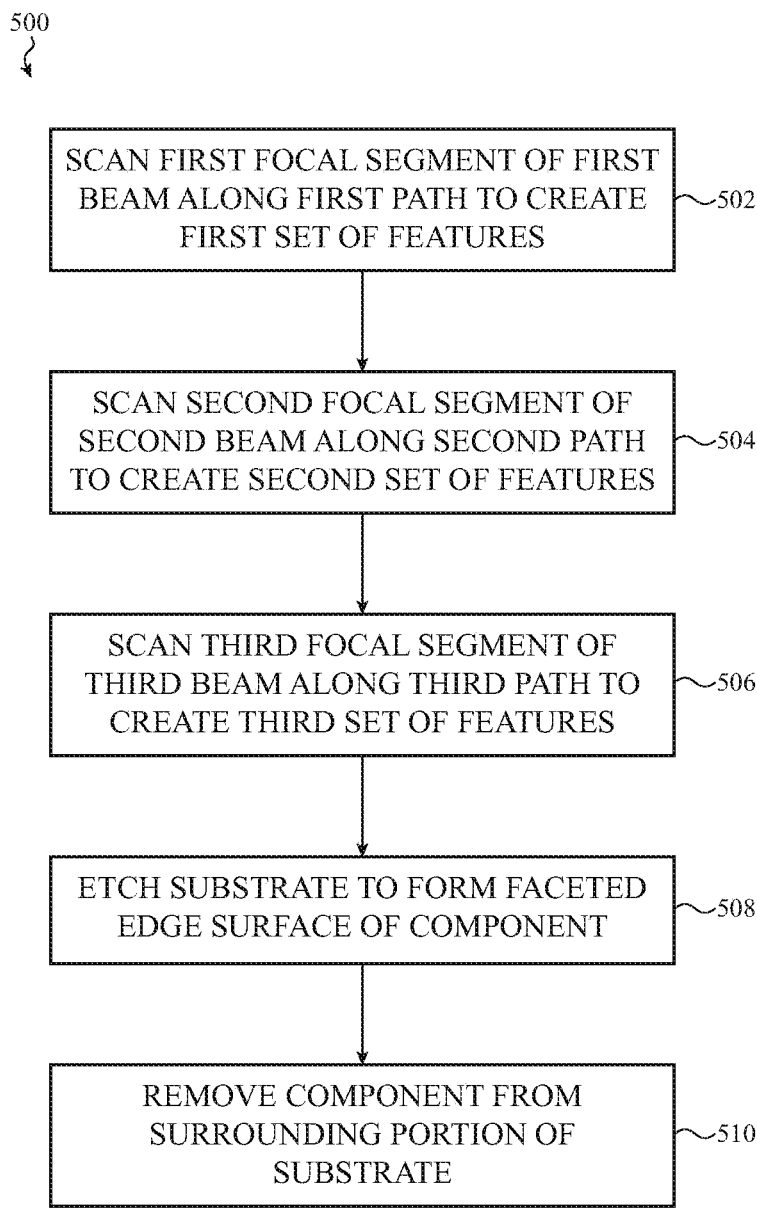
FIG. 5 shows a flow chart of a laser-based cutting process.

In techniques described herein, one or more laser modification operations use a laser system which produces a beam that comprises a focal segment defined by an elongated core of light. The laser system may scan the beam along a path. The focal segment of the beam may extend into the transparent substrate and may be used to modify the transparent substrate. The orientation and the length of the focal segment(s) can be configured to precisely control the size and shape of the opening formed in the transparent substrate. In some cases, the beam is configured so that the focal segment forms an oblique angle with respect to a surface of the transparent substrate without requiring tilting of the transparent substrate. As used herein, the term "oblique" may be used to describe an angle that is not perpendicular or at a right angle with respect to a particular reference. As described herein, the focal segment may have a more uniform intensity across a cross-section of the focal segment than a laser feature produced by tilting the transparent substrate with respect to the processing head (or vice versa). The laser system may produce a series of pulses so that the beam has a pulsed nature. The additional description of laser systems and beams provided with respect to FIG. 5 is generally applicable herein.

Figure 11A:
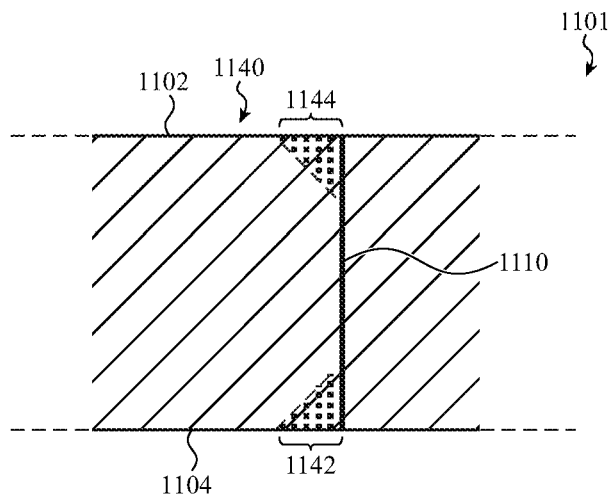
FIGS. 11A, 11B, and 11C schematically show cross-sectional views of stages in another laser-based cutting process.
Figure 11B:
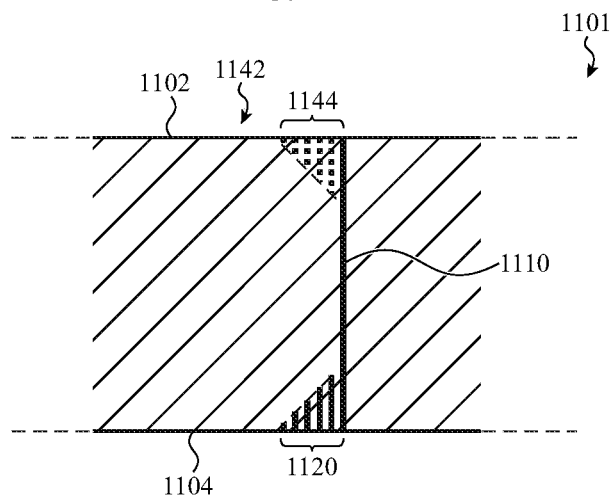
Figure 11C:
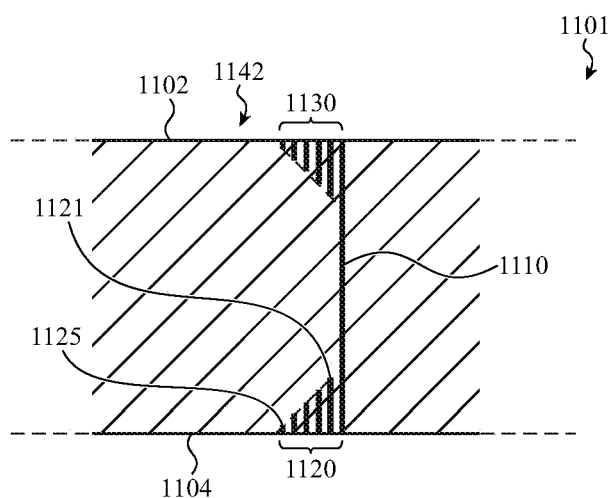

In some cases, the laser-based techniques described herein can be used to separate a transparent component with a shaped edge profile from a larger substrate. Such laser-based separation techniques are also referred to herein as laser-based cutting techniques. In some cases, beam(s) are scanned along multiple paths on the substrate to produce the shaped edge profile. The length and orientation of the focal segment(s) within the transparent substrate may be configured to produce the shaped edge profile. In embodiments, the laser-based separation technique produces an edge surface extending between a front surface and a rear surface of the transparent component and this edge surface defines the shaped edge profile. For example, the beam(s) may define focal segments having different orientations with respect to major surfaces of the substrate to produce a faceted edge profile, as described with respect to FIGS. 7A, 7B, and 7C. As an additional example, the beam(s) may be scanned along a series of nested paths to produce a facet of the edge profile, as shown in FIGS. 11A, 11B, and 11C, or to produce a curved edge profile. As previously discussed, one or more laser modification operations may be followed by an etching operation.

Figure 2:
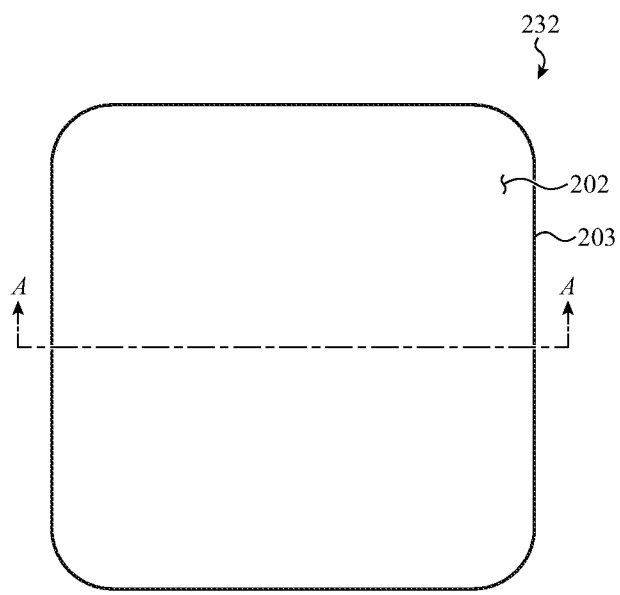
FIG. 2 shows a top view of a component for an electronic device.
Figure 3:
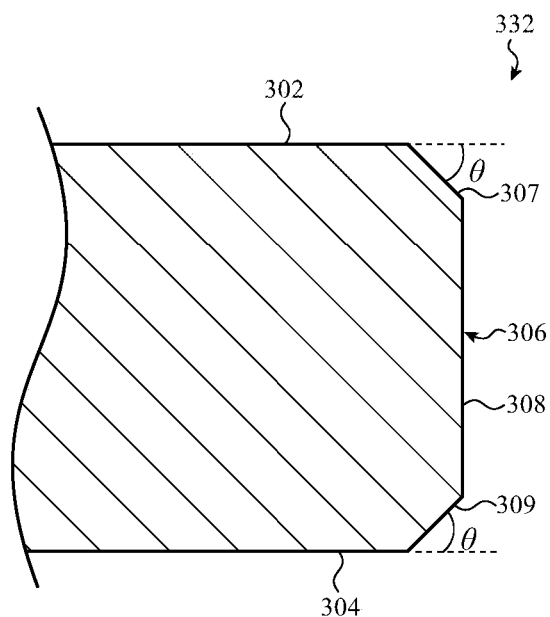
FIG. 3 shows a partial cross-sectional view of a component.
Figure 4:
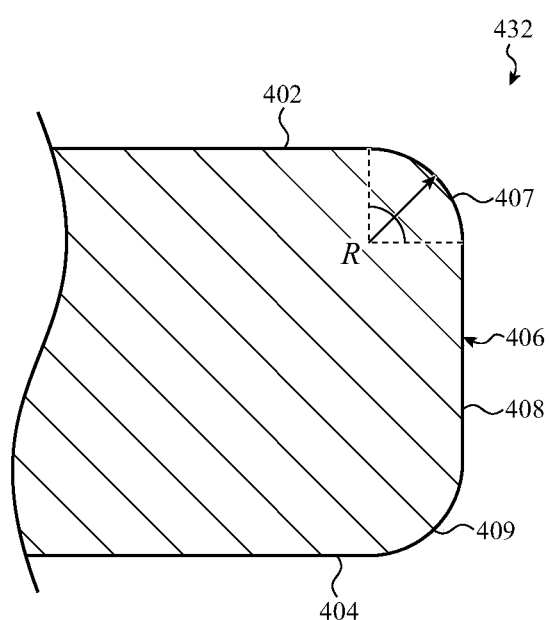
FIG. 4 shows a partial cross-sectional view of another component.

Forming the edge profile of the transparent component during the operation of separating the transparent component from the transparent substrate can provide process efficiencies. An additional benefit of the laser-based separation techniques described herein is that these techniques can produce an edge finish that is more resistant to damage than a typical finish produced by mechanical grinding and polishing techniques. In some embodiments, an edge surface of the component may define recessed features which have a characteristic feature size less than about 10 microns (10 micrometers), less than about 1 micron, from about 100 nm to about 5 microns, from about 100 nm to less than about 1 micron, from about 25 nm to less than about 1 micron, from about 100 nm to about 750 nm, from about 50 nm to about 500 nm, from about 50 nm to about 200 nm, from about 25 nm to about 500 nm, from about 25 nm to about 200 nm, or from about 25 nm to about 150 nm. The characteristic feature size may be a diameter of the recessed features or a spacing between the recessed features. In additional embodiments, an edge surface of the component may define lateral features which repeat through the thickness. These lateral features may have a characteristic spacing less than 50 microns, such as a characteristic spacing from about 10 microns to about 40 microns. In some cases, the size of at least some of the recessed features (e.g., depressions) is less than the characteristic spacing of the lateral features and is on the order of hundreds of nanometers. The description of edge profiles and edge finishes provided with respect to FIGS. 2, 3, and 4 is generally applicable herein and is not repeated here.

In additional cases, the laser-based techniques described herein can be used to form through-holes and/or blind holes in a transparent substrate or component. For example, a beam may be scanned around a closed path and a focal segment of the beam may extend through a thickness of a transparent substrate or component to produce a through-hole. In some examples, a beam may be used to locally modify the transparent substrate to produce a fine through-hole or blind hole as shown in the example of FIG. 13B. In embodiments, the diameter of such a hole may be less than about 1 mm. In additional examples, the hole may be larger in diameter, such as a hole configured to facilitate positioning of one or more device components, such as an optical module of a camera assembly or a sensor assembly or a speaker. In some embodiments, the same laser apparatus can be used to form one or more sets of features in a transparent substrate which are used to separate a transparent component from the transparent substrate and to form one or more sets of features which are used to form through-holes and/or blind holes in the portion of the transparent substrate which becomes the transparent component.

These and other embodiments are discussed below with reference to FIGS. 1A-14. However, those skilled in the art will readily appreciate that the detailed description given herein with respect to these figures is for explanatory purposes only and should not be construed as limiting.

FIG. 1A depicts an example electronic device 100. In embodiments, the electronic device 100 has an enclosure 110 that includes a transparent cover member or other transparent component produced by a technique as described herein. In some embodiments, the electronic device 100 may be a digital media player, a portable media player, and/or a home control device. In additional embodiments, the electronic device 100 may be a computing device (e.g., a desktop, notebook, laptop, or tablet computing device), a mobile telephone (also referred to as a mobile phone), an input device, or another type of portable electronic device. As shown in FIG. 1A, the electronic device 100 has a form factor in which the height of the device is greater than both the width and the length of the top face. In addition, the width and the length of the top face of the electronic device 100 are depicted as similar in size. The form factor shown in the example of FIG. 1A is exemplary rather than limiting and in additional examples the height may be less than the width and/or the length, the width and the length of the top face may differ, or both.

As shown in FIG. 1A, the electronic device 100 comprises an enclosure 110 including an enclosure component 112 and a cover 122. The cover 122 may define at least a portion of a front surface 102 of the electronic device and may be referred to as a front cover. In the example of FIG. 1A, the cover 122 defines a substantial entirety of the front surface 102 of the electronic device. In some examples, the enclosure further includes another cover which defines at least a portion of a rear surface 104 of the electronic device and which may be referred to as a rear cover. Internal components of the device may be at least partially enclosed by the enclosure 110 and, in some cases, may be positioned within an internal cavity defined by the enclosure.

The enclosure 110 may include one or more transparent components. The transparent component may be cut to size using a laser cutting process and/or holes may be introduced into the transparent component using a laser drilling process as described herein. In some cases, the transparent component is in the form of a cover member included in the front cover 122 and/or the rear cover.

Figure 1B:
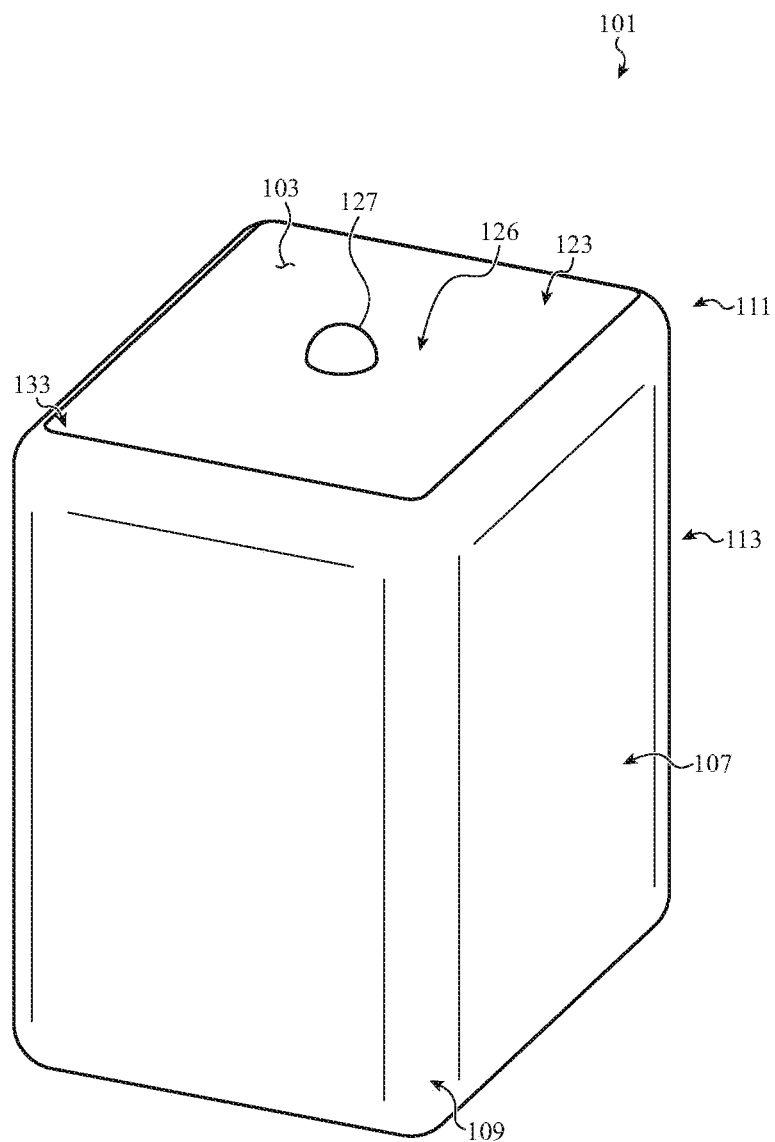
FIG. 1B depicts another example electronic device.

In some embodiments, a cover of the electronic device 100, such as the cover 122, is three-dimensional (e.g., non-planar) or defines a contoured profile. For example, the cover 122 may define a peripheral portion that is not coplanar with respect to a central portion. An example of a three-dimensional shape is a shape that defines a generally planar central portion and a peripheral portion extending out of the plane defined by the central portion. The peripheral portion may, for example, define a side wall of an electronic device enclosure, while the central portion defines a front surface (which may define a transparent window that overlies a display). As an additional example, a cover may define a surface protrusion (an example of which is shown in FIG. 1B), a surface recess, and/or one or more curved surfaces. In additional embodiments, the cover may be substantially planar. A transparent component such as a transparent cover member 132 may be shaped similarly to its respective cover.

In the example of FIG. 1A, the cover 122 is positioned over a display 144 that is at least partially enclosed or surrounded by the enclosure component 112 of the enclosure 110. The cover 122 may define a transparent region for viewing the display. The display 144 may be a liquid-crystal display (LCD), a light-emitting diode (LED) display, an LED-backlit LCD display, an organic light-emitting diode (OLED) display, an active layer organic light-emitting diode (AMOLED) display, and the like. In some embodiments, the display 144 may be attached to (or may abut) the cover 122.

Figure 14:
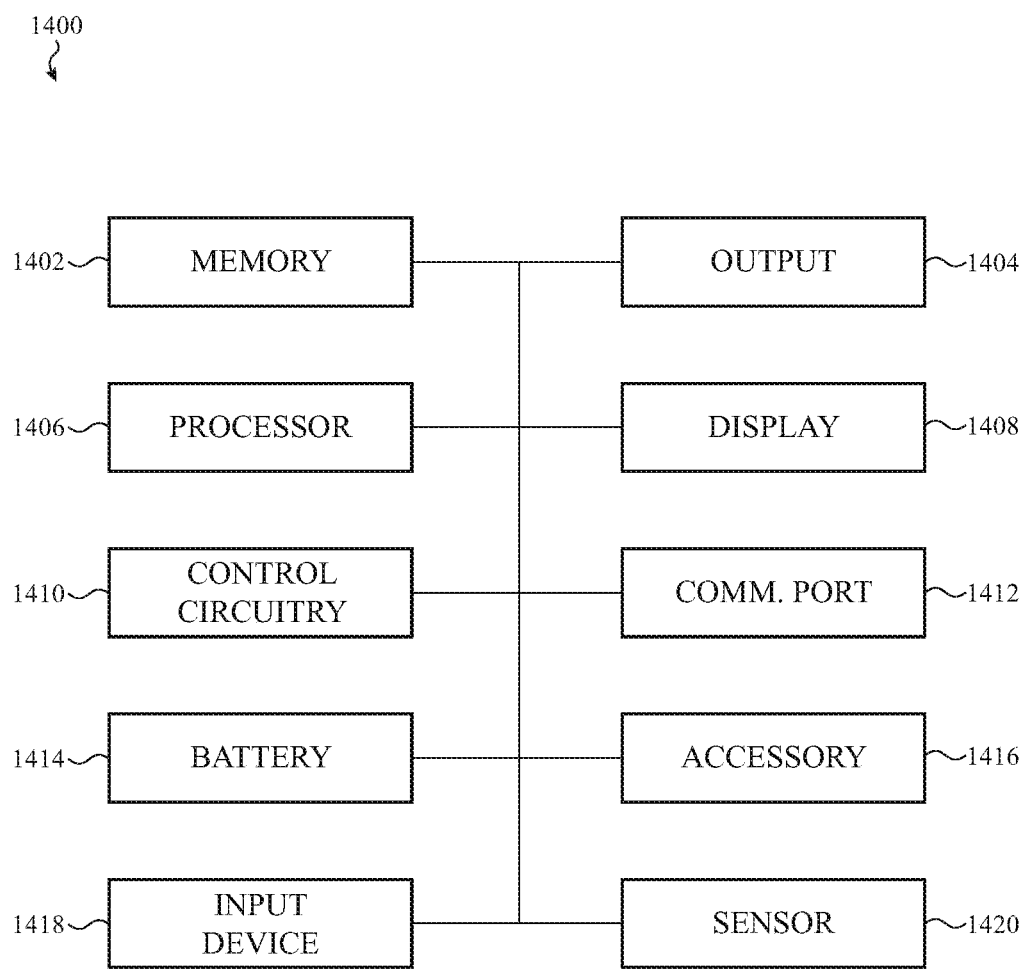
FIG. 14 shows a block diagram of a sample electronic device that can incorporate a laser-modified transparent component.

Alternately or additionally, the cover 122 may be integrated with or coupled to a touch sensor that is configured to detect or estimate a location of a touch along the exterior surface of the cover 122. The touch sensor may include an array of capacitive electrodes that are positioned below the cover 122 and, in some instances, may be integrated with the display. In additional examples, the cover 122 may be integrated with or coupled to an electronic device component which provides an alternate or an additional functional characteristic. Capacitive and/or other functional characteristics may be associated with planar and/or non-planar regions of the cover 122. The additional description of displays and sensors provided with respect to FIG. 14 is generally applicable herein and is not repeated here.

The cover 122 includes a cover member 132, which may be referred to as a front cover member. The cover member 132 may extend laterally across the cover 122, such as substantially across the width and the length of the cover 122. The cover member 132 may have a thickness from about 0.3 mm to about 0.75 mm or from about 0.5 mm and to about 1 mm. In some embodiments the cover member 132 is a glass component (a glass cover member) or a glass ceramic component. The additional description of glass and glass ceramic components provided herein with respect to the transparent component 232 of FIG. 2 is generally applicable herein. In additional embodiments, the cover member 132 may be formed of one or more of the other materials described with respect to the transparent component 232 of FIG. 2. In some embodiments, the cover 122 may define one or more holes extending through its thickness, with the hole positioned over another device component such as a microphone, speaker, or the like.

The cover 122 may include one or more coatings applied to the cover member. For example, an anti-reflection and/or smudge-resistant coating may be applied to an exterior surface of the cover member. As an additional example, a coating designed to produce a visual effect, such as an opaque mask coating, may be applied to an interior surface of the cover member. In a further example, the cover 122 may include a laminate material (e.g., in sheet form) applied along an interior surface of the cover 122 to provide structural support/reinforcement, an electrical function, a thermal function, and/or a visual effect. The laminate material may conform to a three-dimensional portion of the cover.

As shown in FIG. 1A, the enclosure 110 further includes an enclosure member 112, which for simplicity may also be referred to herein as a housing. The cover 122 may be coupled to the enclosure member 112. For example, the cover 122 may be coupled to the enclosure member with an adhesive, a fastener, an engagement feature, or a combination thereof.

In embodiments, the enclosure member 112 at least partially defines a side surface 106 of the electronic device 100. In the example of FIG. 1A, the enclosure member 112 defines all four sides of the electronic device 100. The enclosure member 112 of FIG. 1A also defines corner regions 108, the boundaries of which are generally indicated by vertical lines. One or more of the corner regions may define a compound curvature. In additional embodiments, an enclosure member 112 may be positioned internal to the electronic device 100 and one or more of a front cover 122 or a rear cover may define all or most of the side surface of the electronic device. In the example of FIG. 1A, the electronic device 100 includes an input device 152. The enclosure component 112 may define an opening to accommodate the input device. In additional examples, an enclosure component may define one or more openings in a side surface to allow (audio) input or output from a device component such as a microphone or speaker, to provide a window for transmission and/or receipt of a wireless signal and/or to accommodate an electrical port or connection.

In some embodiments, the enclosure component 112 is formed from a single material and in some examples may be a monolithic component. For example, the enclosure component 112 may be formed from a glass material, a metal material, a ceramic material, a glass ceramic material, or a polymer material. In additional embodiments, an enclosure component may include multiple members. For example, the enclosure component may include one or more metal members, one or more glass members, or one or more glass ceramic members. In some cases, one or more members may be a transparent component as described herein. In some cases, an enclosure member is formed from a series of metal segments that are separated by dielectric segments that provide electrical isolation between adjacent metal segments. For example, a dielectric segment may be provided between a pair of adjacent metal segments. One or more of the metal segments may be coupled to internal circuitry of the electronic device 100 and may function as an antenna for sending and receiving wireless communication. The dielectric segments may be formed from one or more dielectric materials such as a polymer, a glass, or a ceramic material. As referred to herein, a component or member formed from a particular material, such as a glass or a metal material, may also include a relatively thin coating of a different material along one or more surfaces, such as an anodization layer, a physical vapor deposited coating, a paint coating, a primer coating (which may include a coupling agent), or the like.

The electronic device 100 may include additional components beyond a display and/or a touch screen. These additional components may comprise one or more of a processing unit, control circuitry, memory, an input/output device, a power source (e.g., a battery), a charging assembly (e.g., a wireless charging assembly), a network communication interface, an accessory, a sensor, or another component that is part of a wireless communication system (e.g., an antenna, a transmitter, a receiver, a transceiver, or the like). Components of a sample electronic device are discussed in more detail below with respect to FIG. 14 and the description provided with respect to FIG. 14 is generally applicable herein.

FIG. 1B shows another example of an electronic device 101. In embodiments, the electronic device 101 has an enclosure 111 that includes a transparent component as described herein. The transparent component may be produced using one or more of the techniques described herein. The electronic device 101 may be any of the electronic devices previously described with respect to the electronic device 100 and may have any of the form factors previously described with respect to that device.

As shown in FIG. 1B, the enclosure 111 includes a cover 123. The cover 123 includes a cover member 133. The cover member 133 may define at least a portion of a front surface 103 of the electronic device and may be referred to as a front cover member. The cover member 133 may extend laterally across the cover 123, such as substantially across the width and the length of the cover 123. In some embodiments the cover member 133 is a transparent component (such as a glass cover member), which may be produced by a technique as described herein. In additional embodiments, the cover member 133 may be formed of one or more materials other than glass, and in some cases may be a glass ceramic cover member. The cover member 133 may be shaped similarly to the cover 123.

In the example of FIG. 1B, the cover 123 defines a protruding portion 127 which protrudes with respect to another portion 126 of the cover. The protruding portion 127 may also be referred to herein as a protruding feature or simply as a feature. More generally, a transparent component such as the cover member 133 may define one or more features which vary in elevation with respect to a neighboring portion or region of the transparent component. A feature which is formed to a different elevation than a neighboring portion of the transparent component may define a protrusion or a recess in some embodiments. In some cases, a device component such as a sensor assembly, a camera assembly, and the like may be provided under a protruding feature. The size of the protruding portion 127 may depend at least in part on the size of a device component underlying the protruding feature. In some embodiments, a lateral dimension (e.g., a width) of the protruding feature may be from about 2 mm to about 10 mm, from about 5 mm to about 30 mm, from about 10 mm to about 20 mm, or from about 15 mm to 30 mm.

In the example of FIG. 1B, the protruding portion 127 is shown as generally curved or rounded in shape. However, this example is not limiting and in other examples a protruding portion may define a substantially plateau-shaped top. The plateau-shaped top may be substantially parallel to an exterior surface defined by an adjacent portion of the cover. The amount of protrusion or offset between the top of the protruding portion 127 and exterior surface of the adjacent portion of the cover may be from about 0.5 mm to about 1.5 mm or from about 0.75 mm to about 2 mm.

When the cover member 133 is shaped similarly to the cover 123, the cover member 133 may also define a protruding portion. In some examples, a cover member 133 that defines a protruding portion has substantially the same thickness as a neighboring portion of the cover member. The protruding portion may be formed using one or more techniques such as a machining technique, a molding technique, a technique in which a greater number of layers forms the protruding portion, and the like. In examples, the thickness of the cover member may be greater than about 0.3 mm and less than about 0.75 mm or greater than about 0.5 mm and less than about 1 mm in both the protruding portion 127 and the portion 126 of the cover 123.

In additional examples, the cover member 133 varies in thickness. The cover member 133 may have a greater thickness in a protruding portion than in an adjacent portion. In embodiments, the cover member 133 may have a thickness in the protruding portion 127 that is at least 10%, 25%, or 50% and up to about 250% greater than a thickness of the cover member in the portion 126 of the cover 123. In some cases, the thickness of the thicker portion of the cover 123 (including the protruding feature) is greater than about 1 mm and less than or equal to about 2 mm or about 2.5 mm. The thickness of the portion 126 of the cover 123 may be greater than about 0.3 mm and less than about 0.75 mm or greater than about 0.5 mm and less than about 1 mm.

In some embodiments, the cover 123 may define one or more holes extending through its thickness. The one or more holes may facilitate positioning of one or more device components, such as a speaker or an optical module of a camera assembly or sensor assembly. In some cases, a through-hole may be formed into the protruding portion 127 and a device component may extend into at least partially into the protruding portion. By the way of example, the electronic device may include one or more optical modules selected from a camera module, an optical sensor module, an illumination module, and a (non-optical) sensor. In some examples, a window may be provided over the through-hole to protect the underlying device component. When the glass cover member 133 is shaped similarly to the cover 123, the glass cover member may also define one-more more through-holes.

In some cases, the cover 123 may be integrated with or coupled to a touch sensor or another electronic device component which provides a functional characteristic to the cover. The cover 123 may include one or more coatings applied to the cover member and these coatings may be similar to the coatings previously described with respect to the cover 122. In some examples, the cover 123 may include a laminate material applied along an interior surface of the cover 123 in a similar fashion as described with respect to FIG. 1A.

The enclosure 111 of the electronic device 101 also includes an enclosure component 113. The enclosure member 113 at least partially defines a side surface 107 of the electronic device 100. In the example of FIG. 1B, the enclosure member 113 defines all four sides of the electronic device 101. The enclosure member 113 of FIG. 1B also defines corner regions 109. The enclosure member 113 may be similar in construction and materials to the enclosure member 112 and the corner regions 109 may be similar to the corner regions 108 and those details are not repeated here.

The electronic device 101 may include one or more components such as a display, one or more sensor assemblies, and/or one or more camera assemblies. As additional examples, the electronic device may comprise one or more of a processing unit, control circuitry, memory, an input/output device, a power source (e.g., battery), a charging assembly (e.g., a wireless charging assembly), a network communication interface, an accessory, a sensor, or another component that is part of a wireless communication system (e.g., an antenna, a transmitter, receiver, transceiver, or the like). Components of a sample electronic device are discussed in more detail below with respect to FIG. 14 and the description provided with respect to FIG. 14 is generally applicable herein.

FIG. 2 shows a top view of a transparent component for an electronic device. The component 232 may be an example of the cover member 132 of FIG. 1A. The transparent component 232 may be substantially transparent to visible light as well as to the wavelength(s) of light produced by the laser system used in the laser modification techniques described herein. For brevity, transparent components may also be referred to as components herein.

The view of FIG. 2 shows a front surface 202 and a perimeter 203 of the front surface 202. The component 232 further defines a rear surface, which may be generally opposite the front surface, and an edge surface extending between the front surface and the rear surface, as shown in FIGS. 3 and 4. One or more of these edge surfaces of the component 232 may be faceted, chamfered, or include a curved surface as described in more detail with respect to FIGS. 3 and 4.

Figure 12A:
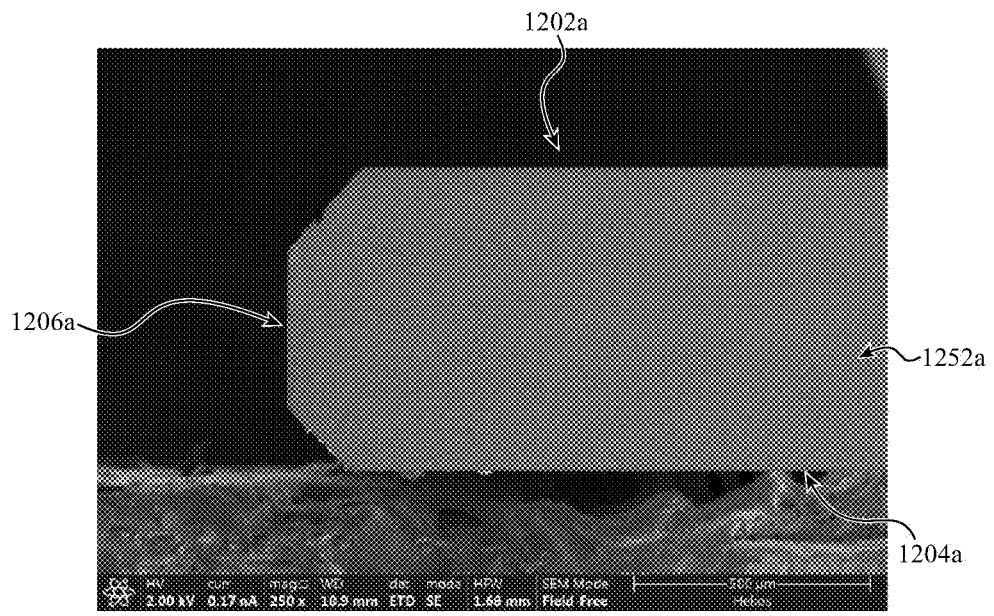
FIGS. 12A, 12B, and 12C show examples of edge surfaces obtained using a laser-based cutting operation.
Figure 12B:
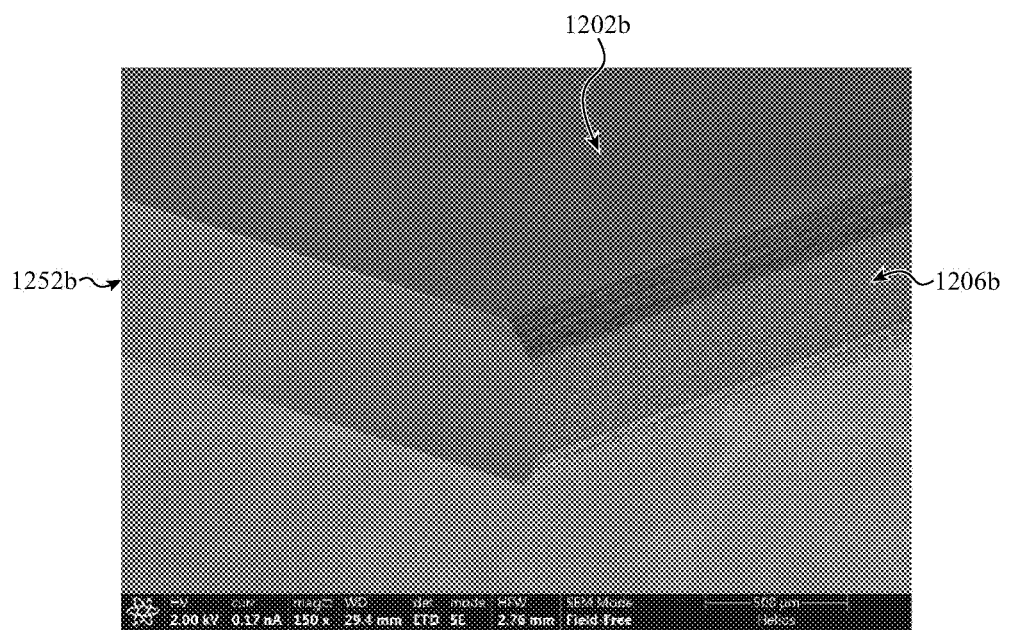
Figure 12C:
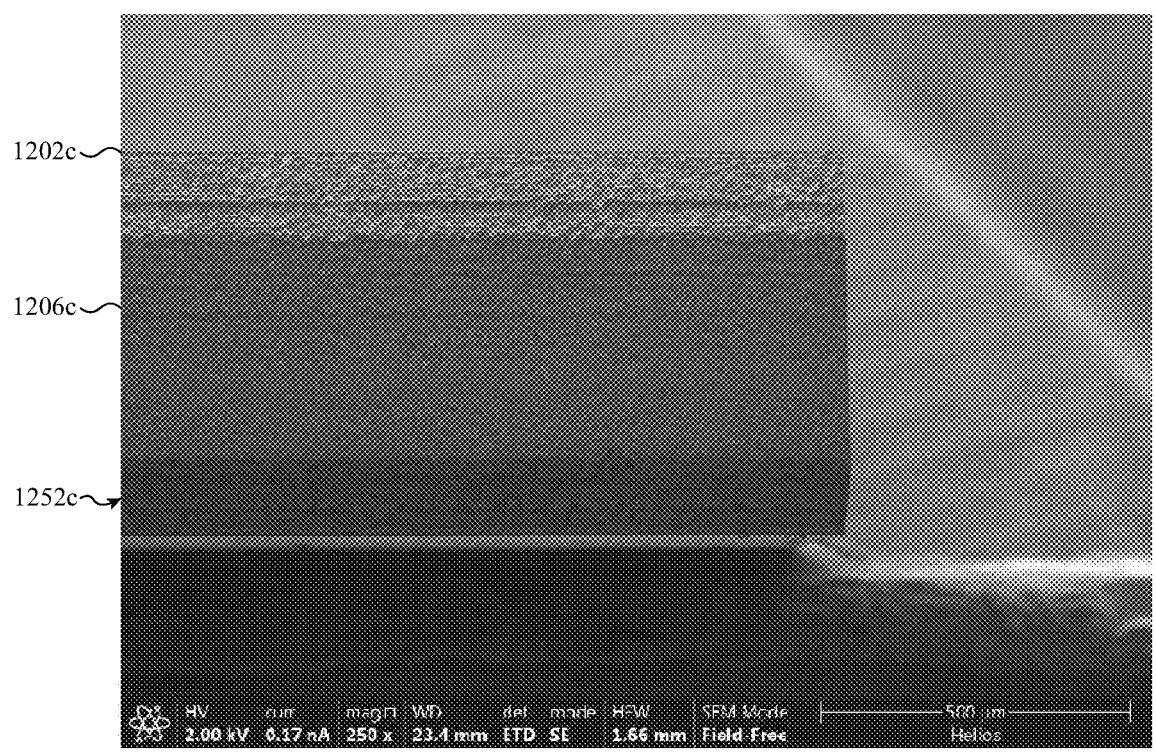

The edge surface may have a surface texture as a result of a laser-based cutting technique as described herein. For example, the edge surface may define a surface texture which includes fine recessed features. In some embodiments, the edge surface of the component may define recessed features which have a characteristic feature size less than about 10 microns, less than 1 micron, from about 100 nm to about 5 microns, from about 100 nm to less than about 1 micron, from about 25 nm to less than about 1 micron, from about 100 nm to about 750 nm, from about 50 nm to about 500 nm, from about 50 nm to about 200 nm, from about 25 nm to about 500 nm, from about 25 nm to about 200 nm, or from about 25 nm to about 150 nm. The characteristic feature size may be a diameter of the recessed features, a spacing between the recessed features, and/or a depth of the recessed features. The surface texture may also include fine lateral features which repeat periodically through the thickness. These lateral features may be substantially parallel to the front or back surface of the transparent component. In some cases, the lateral features may have a spacing in a range from about 10 microns to about 40 microns. In some cases, the size of at least some of the recessed features (e.g., depressions) is less than the characteristic spacing of the lateral features and is on the order of hundreds of nanometers. Examples of these surface textures are shown in FIGS. 12B and 12C and described in more detail with respect to these figures.

In some embodiments, the laser-based separation techniques described herein produce an edge surface that is more resistant to damage than edge surfaces produced by mechanical grinding and polishing techniques. In some cases, the resistance to damage may be assessed by determining a maximum weight that can be dropped onto the component (e.g., using a Gardner test). In additional cases, the resistance to damage can be assessed by determining a maximum height from which the component can be dropped onto a surface such as concrete, asphalt, granite, or the like.

In additional embodiments, a transparent component may further define an opening, which may be positioned over a speaker or other device component. In some cases, the laser modification techniques described herein can be used to form an edge profile around this opening. The opening may be defined by an edge surface extending between the front surface and the rear surface and this edge surface may be similar to or different than the edge surface defined along the perimeter of the transparent component.

Although the transparent component 232 is shown in FIG. 2 as being substantially planar, the principles described herein also relate to transparent components which define a surface protrusion (such as shown in FIG. 1B), a surface recess, and/or one or more curved surfaces. In some embodiments, a component may be three-dimensional or define a contoured profile. For example, a component may define a peripheral portion that is not coplanar with respect to a central portion. The peripheral portion may, for example, define a side wall of an electronic device enclosure, while the central portion defines a front surface.

In some cases, the transparent component 232 may be a glass component, a glass ceramic component, or a component comprising one or more glass portions and one or more glass ceramic portions. In some examples, the transparent component 232 may be chemically strengthened by ion exchange. In additional cases, the transparent component 232 may be a ceramic component such as a sapphire or zirconia component, a polymer component, or a combination comprising one or more polymer layers in combination with one or more glass, glass ceramic or ceramic layers. The transparent component may have a thickness from about 50 microns to about 3 mm, from about 200 microns to about 500 microns, from about 300 microns to 750 microns, from about 500 microns to about 1 mm, or from about 1 mm to about 2.5 mm. In some cases, the transparent component may be a structural member of the enclosure.

A glass component such as a glass cover member may be formed from a silica-based glass material. The glass material may have a network structure, such as a silicate-based network structure. As referred to herein, a "glass cover member," a "glass component," and/or a "glass sheet" may include some relatively small amount of impurities or crystalline material, such as 1% or less, 2% or less, or 5% or less by weight of the member.

In some embodiments, the glass material includes an aluminosilicate glass. As used herein, an aluminosilicate glass includes the elements aluminum, silicon, and oxygen, but may further include other elements. Typically, the glass material includes an ion-exchangeable glass material, such as an alkali metal aluminosilicate glass (e.g., a lithium aluminosilicate glass). An ion-exchangeable aluminosilicate glass may include monovalent or divalent ions that compensate for charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or $Mg^{2+}$.

A glass ceramic component such as a glass ceramic cover member predominantly includes or consists essentially of a glass ceramic material. As referred to herein, a glass ceramic material comprises one or more crystalline phases (e.g., crystals) formed by crystallization of a (precursor) glass material. These crystalline phases can contribute to the favorable mechanical properties of the glass ceramic material. The glass ceramic may further comprise an amorphous (glass) phase and the crystals may be dispersed in the glass phase. In some examples, the amount of the crystalline phase(s) is from 50% to 90%, from 60% to 90%, from 70% to 90%, from 20% to 40%, from 20% to 60%, from 20% to 80%, from 30% to 60%, or from 30% to 80% of the glass ceramic by weight.

By the way of example, the glass ceramic material may be an alkaline silicate, an alkaline earth silicate, an aluminosilicate, a boroaluminosilicate, a perovskite-type glass ceramic, a silicophosphate, an iron silicate, a fluorosilicate, a phosphate, or a glass ceramic material from another glass ceramic composition system. In some embodiments, the glass ceramic portion comprises an aluminosilicate glass ceramic or a boroaluminosilicate glass ceramic. The glass ceramic material may include other elements in addition to the principal elements of the glass ceramic material (e.g., aluminum, silicon, and oxygen for an aluminosilicate). For example, the glass ceramic material (and the precursor glass) may include elements from nucleating agents for the glass ceramic material, such as a metal oxide (Ti, Zr) or other suitable oxide material. Aluminosilicate and boroaluminosilicate glass ceramics may further include monovalent or divalent ions some of which may compensate charges due to introduction of aluminum ions in the material. For example, an aluminosilicate glass ceramic may include alkali metal ions such as $Li^+$ or $Na^+$.

FIG. 3 shows a partial cross-sectional view of a transparent component 332. The cross-sectional view of FIG. 3 may be an example of a cross-sectional view of the transparent component 232 along A-A. The transparent component 332 defines a front surface 302 and a rear surface 304, which is generally opposite the front surface 302. The transparent component 332 further defines an edge surface 306 extending between the front surface and the rear surface. The front and the rear surfaces may be referred to herein as major surfaces of the transparent component. The front surface may at least partially define an exterior surface of the electronic device.

In the example of FIG. 3, the edge surface 306 defines multiple facets. An edge surface defining multiple facets may also be referred to herein as a faceted edge surface. In particular, the edge surface 306 includes a first facet 307, a second facet 308, and a third facet 309. The first facet 307 and the third facet 309 each define a chamfer (also referred to as a chamfer facet) and the second facet 308 defines a side surface of the component. The first facet 307 may define a front chamfer facet and the rear facet 309 may define a rear chamfer facet. As shown in FIG. 3, the first facet 307 defines an angle $\theta$ with respect to the front surface 302 and the third facet 309 defines an angle $\theta$ with respect to the rear surface 304. The angle $\theta$ may be referred to as an exterior angle since it is measured outside the transparent component 332. In some cases, the exterior angle is an acute angle and is between 30 degrees and 60 degrees or between 40 degrees and 50 degrees. The corresponding interior angle may be an obtuse angle and may be between 120 degrees and 150 degrees or between 130 degrees and 140 degrees. As shown in the example of FIG. 3, the front and rear exterior (and interior) angles may be in similar ranges. In additional examples, the front and rear exterior (and interior) angles may be different from one another. In some embodiments, the junctions between the facets and between the facets and the front and rear surfaces may be more well defined or "crisper" than those produced using a mechanical grinding and polishing technique. For example, the profile defined using the techniques described herein may result in corners or features that are substantially sharper (having little or no rounding) as compared to traditional machining techniques. The number of facets shown in the example of FIG. 3 is exemplary rather than limiting and in additional examples the transparent component may have a greater number of facets.

In some embodiments a length of the second facet 308 is greater than that of either the first facet 307 or the third facet 309. For example, the length of the second facet 308 can be from one and one-half to two times greater than a length of either the first facet 307 or the third facet 309.

FIG. 4 shows another partial cross-sectional view of a transparent component 432. The cross-sectional view of FIG. 4 may be an example of a cross-sectional view of the transparent component 232 along A-A. The transparent component 432 defines a front surface 402 and a rear surface 404, which is generally opposite the front surface 402. The transparent component 432 further defines an edge surface 406 extending between the front surface and the rear surface.

The edge surface 406 includes a side surface 408, a curved surface 407 between the front surface 402 and the side surface 408, and a curved surface 409 between the side surface 408 and the rear surface 404. Each of the curved transitions 407 and 409 may define a radius of curvature R. In some cases, the radius of curvature may be from 0.2 to 0.5 times a thickness of the transparent component 432. In additional examples, the curved transitions may define different radii of curvature.

The examples of edge profiles provided with respect to FIGS. 3 and 4 are not limiting and in additional embodiments the edge profile may define a full-round feature (e.g., a radius of curvature equal to half a thickness of the transparent component), an edge profile defining curved surfaces with different radii, or an edge profile defining a spline shape with a variable radius.

FIG. 5 shows a flow chart of a laser-based cutting process 500. The process 500 may be used to cut a transparent component from a transparent substrate. As shown in the example of FIG. 5, the process 500 comprises multiple operations of modifying a transparent substrate using a laser system. As previously discussed, the process 500 uses a laser system which produces one or more beams, each beam comprising an elongated core of light. The elongated core of light may define a focal segment and the focal segment of the beam may be used to modify the transparent substrate by producing laser-formed features within the transparent substrate. A single laser system may produce beams which differ in the length and/or the orientation of the focal segment. Each of the beams may be a Bessel beam or a Bessel-like beam which includes a focal segment as described herein. The laser system may produce pulses of light. The laser-formed features produced in the transparent substrate may include voids, other changes in the internal structure of the transparent component, and combinations of these. For brevity, the laser-formed features may simply be referred to as features herein.

As previously discussed, the process 500 may use a laser system capable of shaping a beam so that a focal segment of the beam defines an oblique angle with respect to a major surface of the transparent substrate (e.g., a front surface and/or a rear surface). In some cases, the laser system may be configured to produce a focal segment oriented at an oblique angle with respect to a surface of the transparent substrate even when a processing head of the laser system and the surface of the substrate are not substantially tilted with respect to each other. Alternately or additionally, a focal segment produced by the laser system may be substantially perpendicular to a major surface of the transparent substrate.

The laser system may include a beam shaping element which is configurable to produce a beam which may have a variety of focal segment orientations with respect to a major surface (or another surface) of the transparent substrate. The beam shaping element may also be configurable to produce a beam which may have a variety of focal segment lengths. The beam shaping element may be configured to produce a focal segment useful for creating the laser-formed features even when the focal segment is oriented at an oblique angle with respect to a surface of the transparent substrate. In some embodiments, the beam shaping element is a spatial light modulator.

The laser system may also include a laser processing head, which may also be referred to herein as an optical head. The laser processing head may face a surface of the transparent substrate. When the laser processing head and the transparent substrate are moved relative to each other, the beam defines a path on the surface of the transparent substrate facing the laser processing head, and this path may also be referred to herein as a surface path. If the path passes through the transparent substrate, the beam may also define a path on the surface of the substrate opposite the facing surface. The beam also defines a route within the transparent substrate, which may also be referred to herein as an internal path. In some cases, the path on the surface and the route within the transparent substrate may be discontinuous due to the pulsed nature of the beam. In some cases, the laser system may include more than one laser processing head, as described in more detail with respect to FIGS. 7A to 7C. In embodiments, the laser processing head(s) of the laser system may face the same surface or different surfaces of the transparent substrate during the process 500.

In some examples, the laser system may produce pulses having a wavelength in the infrared range (e.g., having a wavelength from about 1 μm to about 5 μm). In some embodiments, the laser system may produce pulses having a femtosecond or picosecond duration (or pulse width). For example, the pulse duration may be from 50 femtoseconds to less than 1 picosecond, from 100 femtoseconds to 500 femtoseconds, from 500 femtoseconds to 20 picoseconds, or from 1 picosecond to 50 picoseconds. The repetition rate of the laser system may be from about 50 kHz to about 1000 kHz or from about 100 kHz to about 750 kHz. The scan speed may be varied as desired, and in some embodiments may be from about 250 mm/sec to about 750 mm/sec or from about 500 mm/sec to about 1500 mm/sec. The average power produced during the process may be from about 1 W to about 30 W or from about 10 W to about 75 W. The pulse energy may be on the order of 50 microJoules to 500 microJoules. In some cases, a diameter or width of the beam (e.g., a spot size) may be from about 1 microns to about 10 microns or about 1 micron to about 5 microns and the spot spacing may be from about 1 micron to about 10 microns, or from about 1 micron to about 5 microns. The laser system may be operated with or without burst mode.

The substrate is substantially transparent to the wavelength of the pulses produced during the process 500 and may be formed of any of the materials described with respect to FIG. 2. In some cases, the substrate may be a portion of a "mother sheet" of glass and the edge surfaces of the substrate may be formed by a breaking process and then ground and polished. The major surfaces of the substrate (e.g., the front and rear surfaces) may optionally be ground and polished prior to laser modification of the substrate. The thickness of the substrate may be similar to the thicknesses of the transparent component previously described with respect to FIG. 2.

The process 500 includes an operation 502 of scanning a first beam along a first path to create a first set of features. In embodiments, the operation 502 comprises scanning a first focal segment of the first beam along the first path. The first focal segment may define a first angle that is oblique with respect to a rear surface of the transparent substrate. The first angle may be measured interior to the portion of the substrate that forms the transparent component. When measured inside the transparent substrate this interior angle may be an obtuse angle. This interior angle may have similar values to those described with respect to the transparent component of FIG. 3. In some cases, the first path is a first surface path on a surface of the transparent substrate which faces the laser processing head.

Figure 7A:
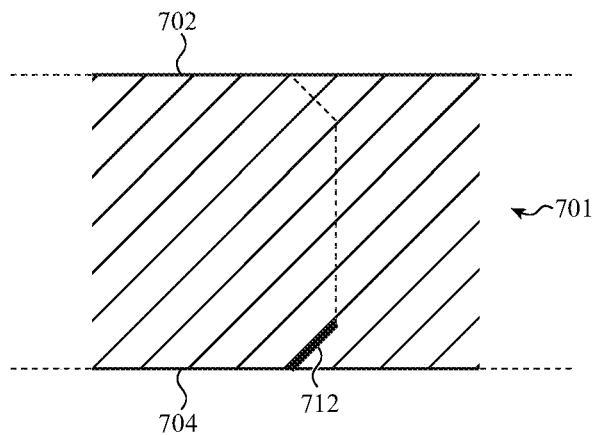
FIGS. 7A, 7B, and 7C schematically show cross-sectional views of stages in a laser-based cutting process.

The interaction of the first beam with the transparent substrate creates a first set of laser-formed features. The first focal segment extends into the transparent substrate in the operation 502. The first set of features may be distributed along the first focal segment and so may also be described as being at the first angle with respect to the rear surface. As previously described, the first focal segment may travel along a first route interior to the transparent substrate and the first set of features may be distributed along the first route. FIG. 7A schematically shows a cross-sectional view of at least a portion 712 of a first route which extends into the transparent substrate and forms an oblique angle with respect to a rear surface of the transparent substrate. As referred to herein, the front surface of the transparent substrate faces a processing head of the laser.

Figure 7B:
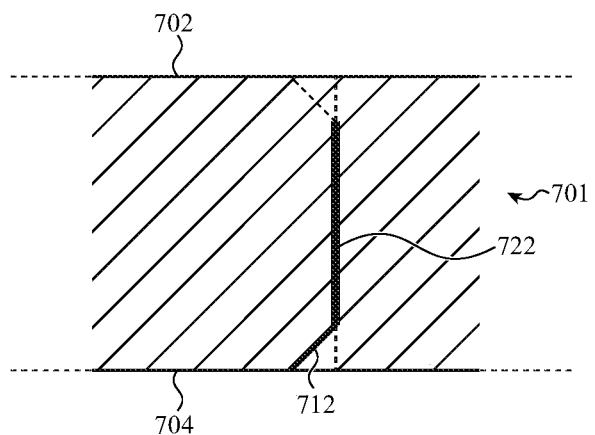

The process 500 also includes an operation 504 of scanning a second beam along a second path to create a second set of features. In embodiments, the operation 504 comprises scanning a second focal segment of the second beam along the second path. The second focal segment is different than the first focal segment. For example, the second focal segment may define a second angle, different from the first angle, with respect to the rear surface. In embodiments, the second focal segment is substantially perpendicular to a rear surface and/or a front surface of the transparent substrate. In additional embodiments, the second focal length may have a different length (or depth from the rear surface) than the first focal length. In some cases, the second path is a second surface path on a surface of the transparent substrate which faces the laser processing head The interaction of the second beam with the transparent substrates creates a second set of laser-formed features. The second focal segment extends into the transparent substrate in the operation 504. The second set of features may be distributed along the second focal segment and so may also be described as being at the second angle with respect to the rear surface. The second focal segment may travel along a second route interior to the transparent substrate and the second set of features may be distributed along the second route. FIG. 7B schematically shows a cross-sectional view of at least a portion 722 of a second route which extends into the transparent substrate and is substantially perpendicular to a rear surface 704 and a front surface 702 of the transparent substrate. The second route may connect to the first route and in some cases the second route may intersect the first route. The second route may also have a different depth than the first route. In embodiments, the second route is substantially perpendicular to a rear surface and/or a front surface of the transparent substrate.

The process 500 also includes an operation 506 of scanning a third beam along a third path to create a third set of features. In embodiments, the operation 506 comprises scanning a third focal segment of the third beam along the third path. The third focal segment may define a third angle that is oblique with respect to a front surface of the transparent substrate. The third focal segment extends into the transparent substrate in the operation 506. The third angle may be measured interior to the portion of the substrate that forms the component. When measured inside the transparent substrate this interior angle may be an obtuse angle. This interior angle may have similar values to those described with respect to the transparent component of FIG. 3. The third focal length may have a different length than the second focal length and/or the first focal length. In some cases, the third path is a third surface path on a surface of the transparent substrate which faces the laser processing head.

Figure 7C:
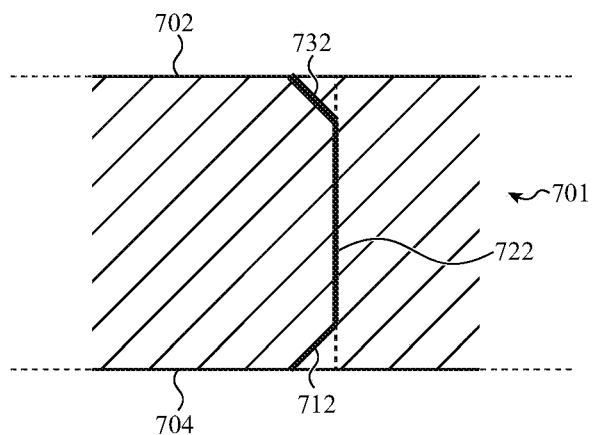

The interaction of the third beam with the transparent substrates creates a third set of laser-formed features. The third focal segment extends into the transparent substrate in the operation 506. The third set of features may be distributed along the third focal segment and so may also be described as being at the third angle with respect to the front surface. The third focal segment may travel along a third route interior to the transparent substrate and the third set of features may be distributed along the third route. FIG. 7C schematically shows a cross-sectional view of at least a portion 732 of a third route which extends into the transparent substrate and forms an oblique angle with respect to a front surface of the transparent substrate. The third route may have a different depth than the second route and/or the first route. The third route may connect to the second route and in some cases may intersect the second route.

A region of the transparent component including the first, the second, and the third sets of features may span a thickness of the transparent component. In some embodiments, the first, the second, and the third routes together span a thickness of the transparent component.

The process 500 also includes an operation 508 of forming a faceted edge surface of the component by selectively etching a region of the transparent substrate including the first, the second, and the third sets of features. In some cases, the first set of features may intersect the second set of features and the second set of features may intersect the third set of features. The operation 508 may produce a faceted edge surface having three facets, an example of which is shown in FIG. 3.

Figure 9:
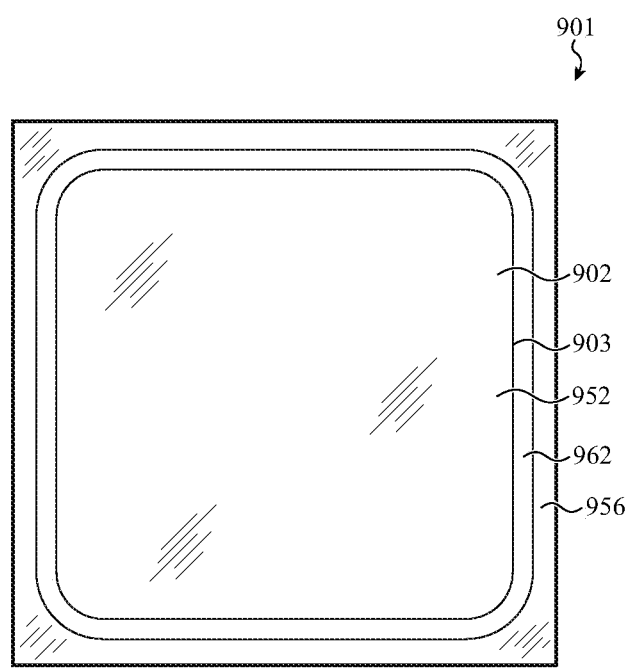
FIG. 9 schematically illustrates a substrate after an etching operation.

As previously discussed, the region including the first, the second, and the third sets of features may etch more quickly than adjacent regions of the substrate. Etching away this region can form an opening (e.g., a kerf) in the transparent component. The opening may form a closed path (e.g., a loop) which defines a periphery of the transparent component as shown in FIG. 9 and the faceted edge surface may extend around the periphery. In some cases, the process 500 may produce an edge surface of the transparent component which is more damage resistant than an edge surface produced using mechanical grinding and polishing methods.

Chemical etching techniques for glass and glass ceramic components may involve using a suitable acid or base etchant to remove portions of the component. The chemical etching may occur in the liquid phase or in a gas phase. Etching techniques also include reactive ion etching, which may use a mixture of a fluorine containing compound such as $CH_4$, $CHF_3$, $SF_6$ and the like in a gas such as argon or xenon. In some cases, the etching time is longer and/or an etching process temperature is longer for a glass ceramic component or ceramic component than for a glass component of similar overall composition. Optionally, the component may be washed following the operation 508.

The process 500 further includes an operation 510 of removing the transparent component from a remaining portion of the transparent substrate following the operation of selectively etching the transparent substrate. Typically, the operation of selectively etching the region of the transparent substrate including the laser-formed features enables the transparent component to be freely removed from the remaining portion of the transparent substrate. The remaining portion may surround the transparent component.

The process 500 may also include additional operations following the operation 510. For example, the process 500 may include one or more operations of polishing the transparent component. The process 500 may also include one or more operations of chemically strengthening the transparent component through ion exchange (e.g., when the transparent component is formed from a glass material, a glass ceramic material, or a combination of these).

Figure 6:
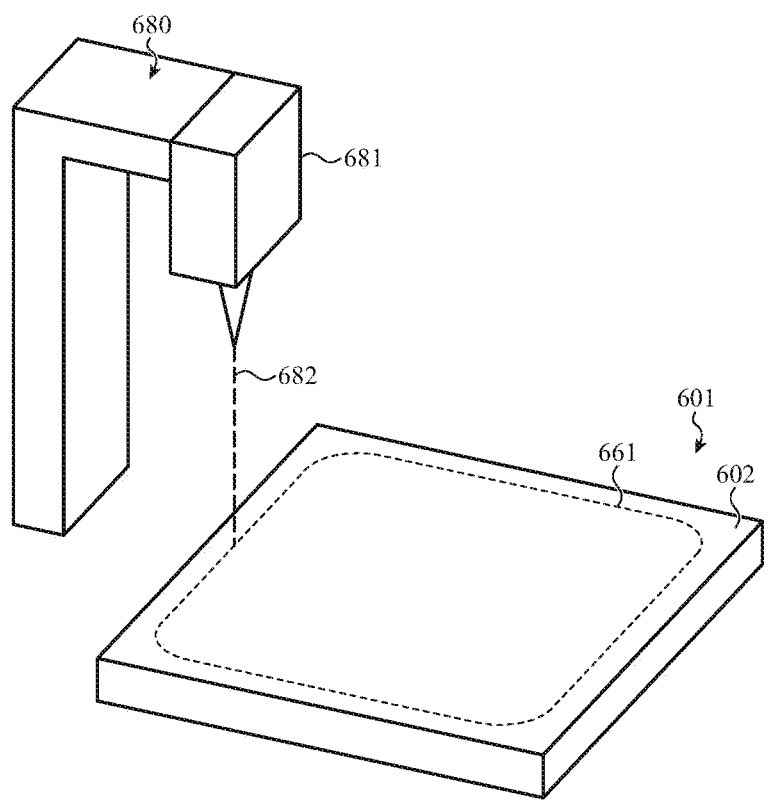
FIG. 6 schematically shows an operation of scanning a laser beam along a path on a substrate.

FIG. 6 schematically shows a laser system 680 and an operation of scanning a beam 682 produced by the laser system 680. The laser system 680, which includes a processing head 681, is simplified for purposes of illustration in FIG. 6. The processing head 681 and the transparent substrate 601 move relative to each other to scan the beam 682 along a path 661 on a front surface 602 of the transparent substrate 601.

As previously described with respect to FIG. 5, the laser system 680 may produce a beam comprising an elongated core of light and the elongated core of light may define a focal segment. The focal segment of the beam may extend into the transparent substrate and may be scanned along the path 661 to create a set of laser-formed features within the transparent substrate. The beam 682 is shown in FIG. 6 as approaching the front surface at an angle which is approximately perpendicular to the front surface 602. However, this example is not limiting and the beam 682 may be oriented with respect to the front surface 602 as required to provide the desired orientation of the focal segment with respect to the front surface 602 and/or a rear surface of the transparent substrate 601.

In additional cases, the laser system 680 may comprise multiple processing heads, with each processing head in optical communication with a different optical system of the laser system. The additional description of laser systems, beams, and focal segments provided with respect to FIG. 5 is generally applicable herein and is not repeated here.

In additional examples, one or more additional beams may be scanned along one or more additional paths to form additional laser-formed features within the transparent substrate. After etching, an opening may be formed in the transparent substrate 601. For example, the opening may be similar to the openings described with respect to FIGS. 1A, 1B, and 2 (e.g., an opening to allow input or output from a device component).

FIGS. 7A, 7B, and 7C schematically show cross-sectional views of stages in a laser-based cutting process. As previously described with respect to FIG. 5, the focal segment of a beam may be scanned along a path such as the path 661 to create a set of laser-formed features within the transparent substrate. The focal segment of the beam typically extends into the transparent substrate and may travel along a route interior to the transparent substrate. FIGS. 7A, 7B, and 7C schematically show examples of at least portions of routes along which the focal segment may travel inside the transparent substrate during a process for producing a faceted edge profile on a transparent component. For simplicity of illustration, the example of FIGS. 7A, 7B, and 7C shows the intersection of portions 712, 722, and 732 of three different routes, but does not necessarily show the entire route traveled by each of the beams.

FIG. 7A schematically shows a cross-sectional view of the portion 712 of a first route along which a first focal segment travels inside the transparent substrate. Each of the portion 712 of the first route and the first focal segment extends into the transparent substrate from the rear surface 704 of the transparent substrate. As previously discussed with respect to FIG. 5, a first set of laser-formed features may be distributed along the first focal segment and the portion 712 of the first route and so FIG. 7A may also generally indicate the positioning of the first set of laser-formed features. Each of the portion 712 of the first route and the first focal segment forms an oblique angle with respect to the rear surface 704 of the transparent substrate 701 (as measured within an interior portion of the transparent substrate 701). The interior portion of the transparent substrate 701 that will form the transparent component is shown to the left in FIGS. 7A, 7B, and 7C.

FIG. 7B schematically shows a cross-sectional view of a portion 722 of a second route along which a second focal segment travels inside the transparent substrate 701. Each of the portion 722 of the second route and the second focal segment extends into the transparent substrate 701. As previously discussed with respect to FIG. 5, a second set of laser-formed features may be distributed along the second focal segment and the portion 722 of the second route and so FIG. 7B may also generally indicate the positioning of the second set of laser-formed features. Each of the portion 722 of the second route and the second focal segment is substantially perpendicular to a rear surface 704 and a front surface 702 of the transparent substrate. As shown in FIG. 7B, the portion 722 of the second route (and the second focal segment) has a depth from the rear surface that is greater than or equal to that of the portion 712 of the first route (and the first focal segment). In some cases, each of the second route and the second focal segment may extend through a thickness of the transparent substrate. The second route forms an obtuse angle with respect to the first route in the example of FIG. 7B (as measured within the interior portion of the transparent substrate 701).

FIG. 7C schematically shows a cross-sectional view of a portion 732 of a third route along which a third focal segment travels inside the transparent substrate 701. Each of the portion 732 of the third route and the third focal segment extends into the transparent substrate 701 from the front surface 702 of the transparent substrate. As previously discussed with respect to FIG. 5, a third set of laser-formed features may be distributed along the third focal segment and the portion 732 of the third route and so FIG. 7C may also generally indicate the positioning of the third set of laser-formed features. As shown in FIG. 7C, each of the portion 732 of the third route and the third focal length forms an oblique angle with respect to the front surface 702 of the transparent substrate 701. Each of the portion 722 of the second route (and the second focal segment) has a depth from the front surface that is greater than or equal to the portion 732 of the third route (and the third focal segment). The third route forms an obtuse angle with respect to the second route in the example of FIG. 7C (as measured within the interior portion of the transparent substrate 701). The portion 712 of the first route, the portion 722 of the second route, and the portion 732 of the third route together span a thickness of the transparent substrate 701.

In the example of FIGS. 7A through 7C the focal segment of the beam travels along the first route before traveling along the second route and the focal segment of the beam travels along the second route before traveling along the third route. However, this example is not limiting, and the focal segments may travel along the different routes in a different order.

In additional examples, the laser system may include two or more optical systems. In some cases, a first optical system of the laser system at least partially produces the first beam and the third beam, and a second optical system of the laser system at least partially produces the second beam. The first optical system may be in optical communication with a first laser processing head and the second optical system may be in optical communication with a second laser processing head. The first optical system may include a spatial light modulator.

As previously discussed, laser-formed features may be distributed along at least the portion 712 of the first route, the portion 722 of the second route, and the portion 732 of the third route in the transparent substrate 701. In some cases, laser-formed features may also be formed some distance away from the focal segment of the beam. Therefore, the region of the transparent substrate 701 that includes the laser-formed features may in some cases extend some distance beyond the positions of the focal segments and the route portions 712, 722, and 732.

Figure 8:
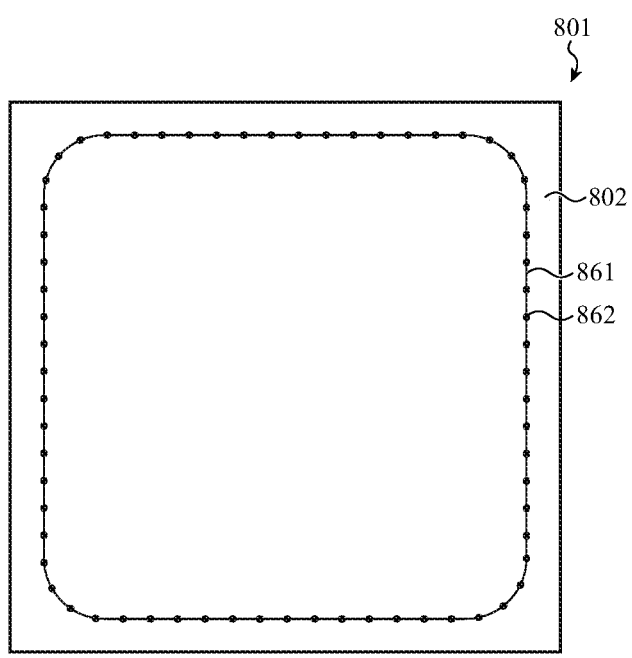
FIG. 8 schematically shows a top view of a substrate and a path of the beam for a laser-based cutting process.

FIG. 8 schematically shows a top view of a transparent substrate 801 and a path 861 of a beam on the front surface 802 for a laser-based cutting process. For example, the path 861 may be used for one or more of the operations of scanning a beam along a path in a laser-cutting process. The path 861 shown in FIG. 8 indicates the pulsed nature of the beam, although the spacing between the spots 862 is exaggerated for convenience of illustration. In some embodiments, the spacing between the spots 862 is from about 1 micron to about 10 microns, or from about 1 micron to about 5 microns. In the example of FIG. 8, the spots 862 are spaced so that they do not overlap. However, in other examples, the spots may touch or partially overlap.

FIG. 9 schematically illustrates a transparent component 952 and a remainder portion 956 of the transparent substrate 901 after an operation of etching the substrate 901. The etching operation may form an etched region 962 which may be an opening that extends through a thickness of the substrate 901. The opening may be referred to as a slot herein. The etched region 962 may form a loop which defines a periphery 903 of a front surface 902 of the transparent component 952. The transparent component 952 may have a faceted edge surface which extends around the periphery 903, as shown in FIGS. 3, 12A, and 12B.

Figure 10:
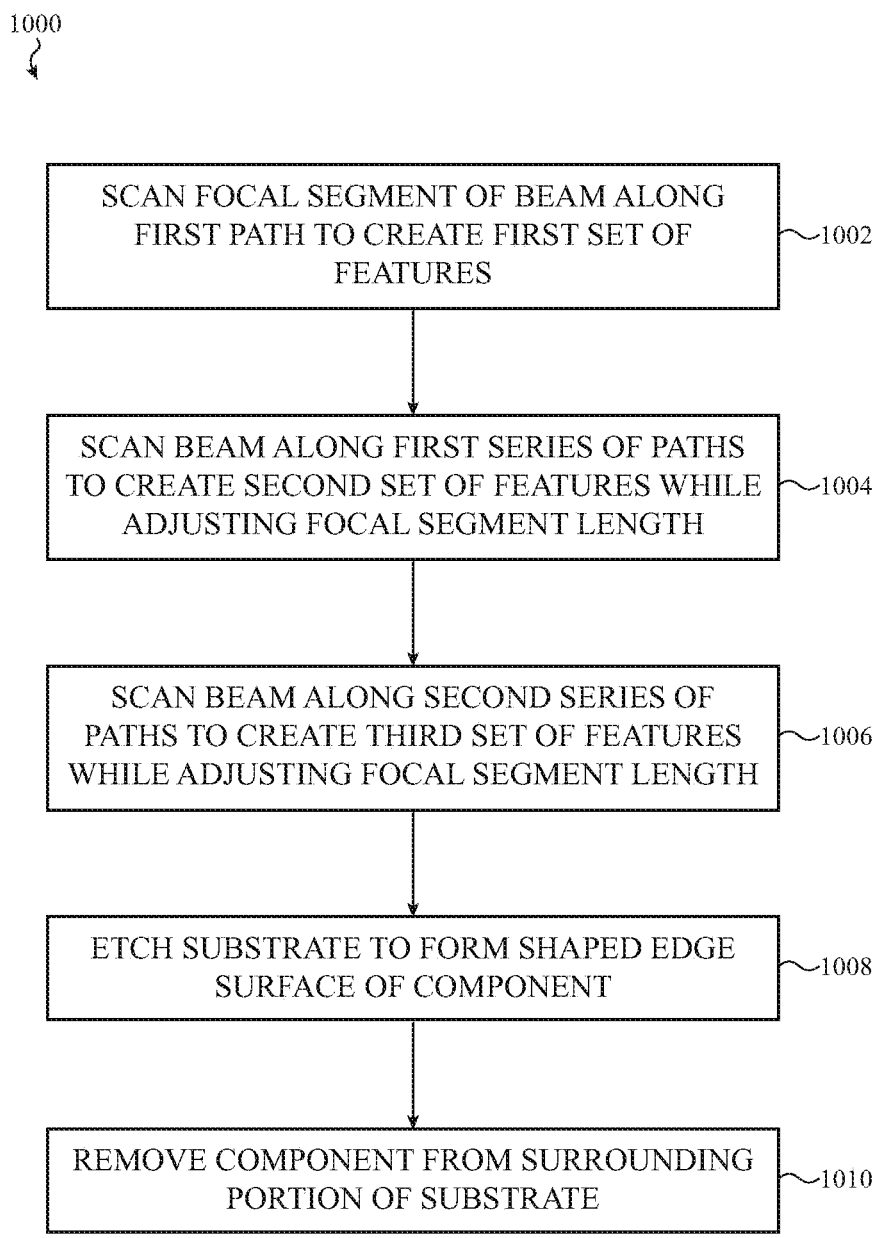
FIG. 10 shows a flow chart of another laser-based cutting process.

In additional embodiments, the disclosure provides additional processes for making a transparent component for an electronic device. The transparent component may have a shaped edge surface, such as a faceted edge surface, an edge surface with rounded corners, and other edge surface shapes other than a flat edge surface. FIG. 10 shows a flow chart of another laser-based cutting process 1000. The process 1000 may be used to cut a transparent component from a transparent substrate. As shown in the example of FIG. 10, the process 1000 comprises multiple operations of modifying a transparent substrate with a beam from a laser system. In embodiments, the laser processing head(s) of the laser system may face the same surface or different surfaces of the transparent substrate during the process 1000. The laser system, the beam characteristics, and the substrate characteristics may be similar to the laser system, the beam characteristics, and the substrate characteristics described with respect to FIG. 5 and those details are not repeated here.

The process 1000 includes an operation 1002 of scanning a focal segment of a beam along a first path to create a first set of laser-formed features. The focal segment may be a first focal segment and the beam may be a first laser beam. The first focal segment may extend through a thickness of the transparent substrate and at least some of the first set of laser-formed features may be formed within the transparent substrate. The first path may be a closed path, which defines a region of the transparent substrate which is interior to the closed path. This region may also be referred to herein as an interior region.

As previously discussed with respect to FIGS. 5 and 7A-7C, the first focal segment of the beam typically extends into the transparent substrate and may travel along a first route interior to the transparent substrate. The first set of laser-formed features may be distributed along the first focal segment and the first route. FIG. 11A schematically shows a cross-sectional view of a first route 1110 within a transparent substrate 1101. The first route 1110 defines an interior region 1140 of the transparent substrate 1101 (to the left of the first route 1110 in FIG. 11A).

The process 1000 also includes an operation 1004 of scanning the beam along a first series of paths to create a second set of laser-formed features. A focal segment of the beam may extend into the transparent substrate and at least some of the second set of laser-formed features may be formed within the transparent substrate. A length of the focal segment of the beam may be adjusted during the operation 1004. For example, the length of the focal segment may be different for at least two of the paths. In some cases, the beam is a second laser beam and the operation 1004 includes pulsing a first series of focal segments along a first series of paths. At least some of the lengths (and their depths from a surface of the transparent substrate) of the first series of focal segments may be different. For example, a focal segment of the first series of focal segments may have a length that is less than that of an adjacent focal segment. The laser-formed features distributed along the first series of focal segments may therefore be distributed to different depths within the transparent substrate. Alternately, the laser-formed features formed by scanning the beam along each path of the series of paths may be referred to as a set of laser-formed features and the laser-formed features formed by scanning the beam along a first series of paths may be referred to as a first collection of sets of laser-formed features.

The paths of the first series of paths may be closed paths. In some examples, the paths of the first series may be nested so that they do not overlap one another. Further, each path of the first series of paths may be nested within a previously formed path. FIG. 11B shows an example of a series of nested paths on the surface 1104. In some cases, the paths of the first series may be spaced apart from one another and from the first path by a distance from 1 micron to 10 microns or from 1 micron to 5 microns. In some examples, the number of paths of the first series of paths may be from 5 to 25 or from 10 to 20.

As previously discussed with respect to FIGS. 5 and 7A-7C, the focal segment(s) of the beam typically extend into the transparent substrate and may travel along a first series of routes interior to the transparent substrate. Laser-formed features (e.g., the second set of laser-formed features) may be distributed along the first series of focal segments and the first series of routes. The first series of routes may extend into an interior region of the transparent substrate as defined by the first path (e.g., to the left of the first path and first route 1110 in FIG. 11B). In some examples, the routes of the first series of routes may have graduated depths from a rear surface of the transparent substrate. For example, the depth of an outer route (closest to the first route 1110) may be longer than the depth of an inner route of the first series of routes. FIG. 11B shows an example of a first series of routes having graduated depths from the rear surface of the transparent substrate. The first series of routes of FIG. 11B may be configured to produce a facet of an edge surface of the component, as discussed in more detail with respect to FIG. 11B.

The process 1000 also includes an operation 1006 of scanning the beam along a second series of paths to create a third set of laser-formed features. A focal segment of the beam may extend into the transparent substrate and at least some of the third set of laser-formed features may be formed within the transparent substrate. The focal segment of the beam may be adjusted during the operation 1006. In some cases, the beam is a third laser beam and the operation 1006 includes pulsing a second series of focal segments along a second series of closed paths. At least some of the lengths (and depths from a surface of the transparent substrate) of the second series of focal segments may be different. For example, a focal segment of the second series of focal segments may have a length that is less than that of an adjacent focal segment. The laser-formed features distributed along the second series of focal segments may therefore be distributed to different depths within the transparent substrate. Alternately, the laser-formed features formed by scanning the beam along each path of the series of paths may be referred to as a set of laser-formed features and the laser-formed features formed by scanning the beam along a second series of paths may be referred to as a second collection of sets of laser-formed features.

The paths of the second series of paths may be closed paths. In some examples, the paths of the second series may be nested so that they do not overlap one another. Further, each path of the second series of paths may be nested within a previously formed path. FIG. 11C shows an example of a series of nested paths on the surface 1102. In some cases, the paths of the second series may be spaced apart from one another and from the first path by a distance from 1 micron to 10 microns or from 1 micron to 5 microns. In some examples, the number of paths of the second series of paths may be from 5 to 25 or from 10 to 20.

As previously discussed with respect to FIGS. 5 and 7A-7C, the focal segment(s) of the beam typically extend into the transparent substrate and may travel along a second series of routes interior to the transparent substrate. Laser-formed features (e.g., a third set of laser-formed features) may be distributed along a second series of focal segments and the second series of routes. The second series of routes may extend into an interior region of the transparent substrate. In some examples, the routes of the second series of routes may have graduated depths from a front surface of the transparent substrate. For example, the depth of an outer route (closest to the first route) may be longer than the depth of an inner route of the second series of routes. FIG. 11C shows an example of a second series of routes having graduated depths from the front surface of the transparent substrate. The second series of routes of FIG. 11C may be configured to produce a facet of an edge surface of the component, as discussed in more detail with respect to FIG. 11C.

The process further includes an operation 1008 of etching the substrate to form a shaped edge surface of the component and an operation 1010 of removing the component from a surrounding portion of the component. The operation 1008 may be similar to the operation 508 of the process 500 and the operation 1010 may be similar to the operation 510 of the process 500 and those details are not repeated here.

The process 1000 may also include additional operations following the operation 1010. For example, the process 1000 may include one or more operations of polishing the transparent component. The process 1000 may also include one or more operations of chemically strengthening the transparent component through ion exchange (e.g., when the transparent component is formed from a glass material, a glass ceramic material, or a combination of these).

FIGS. 11A, 11B, and 11C schematically show cross-sectional views of stages in a laser-based cutting process. For example, the process may be similar to the process 1000 of FIG. 10. As previously discussed with respect to FIGS. 5 and 7A-7C, the focal segment(s) of the beam typically extend into the transparent substrate and may travel along one more routes interior to the transparent substrate.

FIG. 11A schematically shows a cross-sectional view of a first route 1110 along which a focal segment of a beam travels inside the transparent substrate 1101. As previously described with respect to process 1000, the focal segment may create a first set of laser-formed features by traveling the first route 1110. The first route 1110 extends through a thickness of the substrate 1101. The first route 1110 also defines an interior region 1140 of the transparent substrate 1101 (to the left of the first route 1110 in FIG. 11A).

As previously described with respect to the process 1000, the beam may travel along additional routes within the transparent substrate to form additional laser-formed features. Regions 1142 and 1144 are portions of the transparent substrate where the second and the third sets of laser-formed features are formed in subsequent stages of the process and may therefore also be referred to as portions 1142 and 1144 herein. The dashed lines indicate routes to be traveled in subsequent operations. The regions 1142 and 1144 may be configured to produce a faceted edge surface of the transparent component formed from the interior region 1140 as shown in FIGS. 3 and 12A through 12C. In additional examples, the regions 1142 and 1144 may be configured to produce an edge surface with curved transitions (corners) as shown in FIG. 4.

FIG. 11B schematically shows a cross-sectional view of a first series of routes 1120 along which one or more focal segments travel inside the transparent substrate. Each route of the first series of routes extends from the rear surface 1104 into the transparent substrate 1101. Each route has a depth that is different from that of an adjacent route in the example of FIG. 11B. The depth of the routes increases from left to right (from an inner route 1125 to an outer route 1121 as shown in FIG. 11C)]. This increase in the depth of the routes can be obtained by increasing the focal length of the beam from left to right (or decreasing the focal length from right to left). As previously described with respect to process 1000, the beam may travel along the routes of the first series of routes 1120 to create a second set of laser-formed features. Alternately, the laser-formed features formed by scanning the beam along each route of the first series of routes (and each path of the first series of paths) may be referred to as a set of laser-formed features and the laser-formed features formed by scanning the beam along a first series of routes (and paths) may be referred to as a first collection of sets of laser-formed features.

FIG. 11C schematically shows a cross-sectional view of a second series of routes 1130 along which one or more focal segments travel inside the transparent substrate. Each route of the second series of routes 1130 extends from the front surface 1102 into the transparent substrate 1101. The depth of the routes increases from left to right. This increase in the depth of the routes can be obtained by increasing the focal length of the beam from left to right (or decreasing the focal length from right to left). As previously described with respect to process 1000, the beam may travel along the routes of the second series of routes 1130 to create a third set of laser-formed features. Alternately, the laser-formed features formed by scanning the beam along each route of the second series of routes (and each path of the second series of paths) may be referred to as a set of laser-formed features and the laser-formed features formed by scanning the beam along a second series of routes (and paths) may be referred to as a second collection of sets of laser-formed features.

In some examples the beam is scanned along the first path before being scanned along the first series of paths and the beam is scanned along the first series of paths before being scanned along the second series of paths. However, this example is not limiting, and the beam may be scanned along the different paths or series of paths in a different order. The number of paths (and routes) in the first and the second series of paths (and routes) shown in the example of FIGS. 11A through 11C is exemplary rather than limiting and typically will be greater than shown in FIGS. 11A through 11C as previously described with respect to FIG. 10.

In additional embodiments, a process for making a transparent component comprises pulsing a first focal segment of a first laser beam along a first closed path on a transparent substrate to create a first set of laser-formed features having a first depth that extends through the transparent substrate. The process further comprises pulsing a second focal segment of a second laser beam along a second closed path on the transparent substrate to create a second set of laser-formed features that extend to a second depth that is less than a thickness of the transparent substrate. In addition, the method comprises pulsing a third focal segment of a third laser beam along a third closed path on the transparent substrate to create a third set of laser-formed features that extend to a third depth that is less than the second depth. The third path may be nested within the second path and the second path may be nested within the first path. For example, this process can be used to make multiple sets of laser-formed features within the regions 1142 and 1144 of FIG. 11A. The laser system, the beam characteristics, and the substrate characteristics may be similar to the laser system, the beam characteristics, and the substrate characteristics described with respect to FIG. 5 and those details are not repeated here.

In additional examples, the method comprises pulsing a series of focal segments along a series of closed paths to form a collection of sets of laser-formed features. The series of focal segments may include the second focal segment, the third focal segment, and at least one additional focal segment, and the series of closed paths includes the second closed path, the third closed path, and at least one additional closed path. The collection of sets of laser-formed features includes the second set of laser-formed features, the third set of laser-formed features, and at least one additional set of laser-formed features. In some cases, a portion of the transparent substrate including the collection of sets of laser-formed features may be referred to as a subregion. Etching of this portion of the transparent substrate (alternately, subregion), may form (alternately, define) a feature of the shaped surface, such as a facet or a curved surface, rather than the entire edge surface.

The process further comprises forming a shaped edge surface of the transparent component by etching the region(s) of the transparent substrate comprising the first, second, and third sets of laser-formed features. In the example of FIGS. 11A-11C, the portions 1142 and 1144 of the substrate are etched, as well as a portion of the substrate proximate the route 1110. The etching operation may be similar to the operation 508 of the process 500 and those details are not repeated here.

The method may further comprise removing the transparent component from a surrounding portion of the transparent substrate subsequent to etching the region of the transparent substrate. The removal operation may be similar to the operation 510 of the process 500 and those details are not repeated here. The process may also include additional operations following the operation of removing the transparent component from the surrounding portion. For example, the process may include one or more operations of polishing the transparent component. The process may also include one or more operations of chemically strengthening the transparent component through ion exchange (e.g., when the transparent component is formed from a glass material, a glass ceramic material, or a combination of these).

FIGS. 12A, 12B, and 12C show examples of edge surfaces obtained using a laser-based cutting operation. In some cases, the edge surface may have texture parameters as previously discussed with respect to FIG. 2. FIG. 12A shows a cross-sectional view of a transparent component 1252a having a faceted edge surface 1206a extending between a first surface 1202a and a second surface 1204a. The image of FIG. 12A is a scanning electron microscope (SEM) image (secondary electron) at a magnification of 250×.

FIG. 12B shows a different view of a transparent component 1252b having a faceted edge surface 1206b. In the example of FIG. 12B, the faceted edge surface 1206b defines a surface texture which includes fine recessed features. The surface texture of the faceted edge surface 1206b also includes fine lateral features extending generally parallel to the junction between the faceted edge surface 1206b and a first surface 1202b. These lateral features may repeat periodically through the thickness of the transparent component. The image of FIG. 12B is a SEM image (secondary electron) at a magnification of 150×. The scale marker indicates a distance of 500 microns. As shown in the example of FIG. 12B, the lateral features which repeat through the thickness have a characteristic spacing less than 50 microns. The spacing of at least some of the lateral features may be in a range from about 10 microns to about 40 microns. The size of at least some of the recessed features (e.g., depressions) is less than the characteristic spacing of the lateral features and is on the order of hundreds of nanometers.

FIG. 12C is a SEM image (secondary electron) showing a head on view of a faceted edge surface 1206c of a transparent component 1252c. The surface texture of the faceted edge surface 1206c includes fine recessed features as previously discussed with respect to FIG. 12B. The surface texture of the faceted edge surface 1206c also includes fine lateral features generally parallel to the junction between the faceted edge surface 1206c and a first surface 1202c. These lateral features may repeat periodically through the thickness of the transparent component. The lateral dimension (diameter) of at least some of the recessed features (e.g., depressions) is less than 250 nm, and in some cases may be less than 200 nm or even less than 125 nm. In the example of FIG. 12C, at least some of the depressions define a rounded perimeter. The magnification is 250× and the scale marker indicates a distance of 500 microns in FIG. 12C.

Figure 13A:
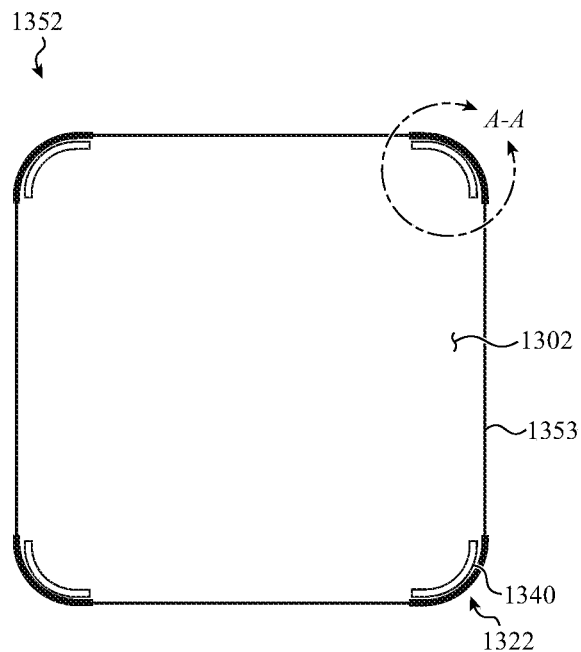
FIG. 13A shows an example of another laser-treated component and FIG. 13B is a detail view of FIG. 13A.
Figure 13B:
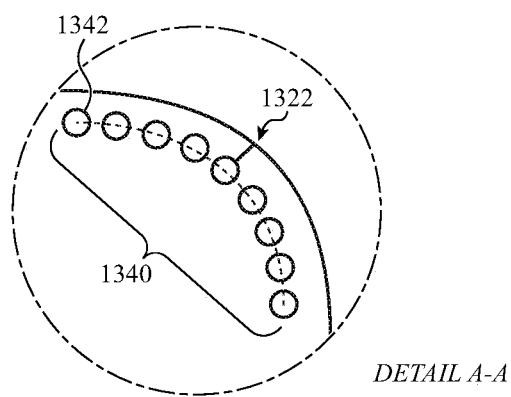

FIG. 13A shows another example of a laser-treated component. The transparent component 1352 defines one or more holes formed by a laser-based drilling process. In particular, the holes are formed by etching away laser-modified regions of the transparent component. The laser-based drilling process may be used to form through-holes, blind holes, or combinations of these. The laser system, beam characteristics, and etching operation may be similar to those previously described with respect to FIG. 5 and those details are not repeated here.

In the example of FIG. 13A, an array 1340 of laser-formed features are formed along a corner region 1322 of a transparent component 1352. The array 1340 of laser-formed features may help arrest propagation of a crack resulting from an impact to the corner region 1322. A front surface 1302 of the transparent component 1352 defines a perimeter 1353 and the array 1340 of laser-formed features may be offset from the perimeter 1353 in the corner region 1322. In some embodiments, a laser-based cutting process may be used to form the perimeter 1353 and the edge surface of the transparent component 1352.

FIG. 13B shows a detail view A-A of FIG. 13A. As shown in FIG. 13B, the laser-formed features of the array 1340 are holes 1342 so that the array 1340 is an array of holes. The holes 1342 are offset from the perimeter 1353 in a corner region 1322 of the transparent component 1352. The diameter of the holes 1342 shown in FIG. 13B is exaggerated for convenience of illustration, but in some cases the diameter of the holes 1342 may be less than about 1 mm, such as from about 2 microns to about 500 microns. In some embodiments the individual holes 1342 are small enough so that they are not readily viewable by the unaided eye. As previously discussed, the array 1340 of holes 1342 may be configured to help arrest propagation of a crack resulting from an impact to the corner region 1322. The number and spacing of the hole features 1342 shown in FIG. 13B are exemplary rather than limiting. The array of holes may be at least partially filled with a transparent material having an index of refraction that is substantially matched to the glass material or the glass ceramic material. Filling of the hole features 1342 can limit or prevent accumulation of debris. In some cases, the transparent material may be a polymer material.

FIG. 14 shows a block diagram of a sample electronic device that can incorporate a transparent component as described herein, such as a transparent glass or glass ceramic cover member. The schematic representation depicted in FIG. 14 may correspond to components of the devices depicted in FIGS. 1A to 13 as described above. However, FIG. 14 may also more generally represent other types of electronic devices including transparent components as described herein.

In embodiments, an electronic device 1400 may include sensors 1420 to provide information regarding configuration and/or orientation of the electronic device in order to control the output of the display. For example, a portion of the display 1408 may be turned off, disabled, or put in a low energy state when all or part of the viewable area of the display 1408 is blocked or substantially obscured. As another example, the display 1408 may be adapted to rotate the display of graphical output based on changes in orientation of the device 1400 (e.g., 90 degrees or 180 degrees) in response to the device 1400 being rotated.

The electronic device 1400 also includes a processor 1406 operably connected with a computer-readable memory 1402. The processor 1406 may be operatively connected to the memory 1402 component via an electronic bus or bridge. The processor 1406 may be implemented as one or more computer processors or microcontrollers configured to perform operations in response to computer-readable instructions. The processor 1406 may include a central processing unit (CPU) of the device 1400. Additionally, and/or alternatively, the processor 1406 may include other electronic circuitry within the device 1400 including application specific integrated chips (ASIC) and other microcontroller devices. The processor 1406 may be configured to perform functionality described in the examples above.

The memory 1402 may include a variety of types of non-transitory computer-readable storage media, including, for example, read access memory (RAM), read-only memory (ROM), erasable programmable memory (e.g., EPROM and EEPROM), or flash memory. The memory 1402 is configured to store computer-readable instructions, sensor values, and other persistent software elements.

The electronic device 1400 may include control circuitry 1410. The control circuitry 1410 may be implemented in a single control unit and not necessarily as distinct electrical circuit elements. As used herein, "control unit" will be used synonymously with "control circuitry." The control circuitry 1410 may receive signals from the processor 1406 or from other elements of the electronic device 1400.

As shown in FIG. 14, the electronic device 1400 includes a battery 1414 that is configured to provide electrical power to the components of the electronic device 1400. The battery 1414 may include one or more power storage cells that are linked together to provide an internal supply of electrical power. The battery 1414 may be operatively coupled to power management circuitry that is configured to provide appropriate voltage and power levels for individual components or groups of components within the electronic device 1400. The battery 1414, via power management circuitry, may be configured to receive power from an external source, such as an alternating current power outlet. The battery 1414 may store received power so that the electronic device 1400 may operate without connection to an external power source for an extended period of time, which may range from several hours to several days.

In some embodiments, the electronic device 1400 includes one or more input devices 1418. The input device 1418 is a device that is configured to receive input from a user or the environment. The input device 1418 may include, for example, a push button, a touch-activated button, a capacitive touch sensor, a touch screen (e.g., a touch-sensitive display or a force-sensitive display), a capacitive touch button, a dial, a crown, or the like. In some embodiments, the input device 1418 may provide a dedicated or primary function, including, for example, a power button, volume buttons, home buttons, scroll wheels, and camera buttons.

The device 1400 may also include one or more sensors or sensor modules 1420, such as a force sensor, a capacitive sensor, an accelerometer, a barometer, a gyroscope, a proximity sensor, a light sensor, or the like. In some cases, the device 1400 includes a sensor array (also referred to as a sensing array) which includes multiple sensors 1420. For example, a sensor array associated with a protruding feature of a cover member may include an ambient light sensor, a Lidar sensor, and a microphone. As previously discussed with respect to FIG. 1B, one or more camera modules may also be associated with the protruding feature. The sensors 1420 may be operably coupled to processing circuitry. In some embodiments, the sensors 1420 may detect deformation and/or changes in configuration of the electronic device and be operably coupled to processing circuitry that controls the display based on the sensor signals. In some implementations, output from the sensors 1420 is used to reconfigure the display output to correspond to an orientation or folded/unfolded configuration or state of the device. Example sensors 1420 for this purpose include accelerometers, gyroscopes, magnetometers, and other similar types of position/orientation sensing devices. In additional examples, the sensors 1420 may include a microphone, an acoustic sensor, a light sensor (including ambient light, infrared (IR) light, ultraviolet (UV) light), an optical facial recognition sensor, a depth measuring sensor (e.g., a time of flight sensor), a health monitoring sensor (e.g., an electrocardiogram (ERG) sensor, a heart rate sensor, a photoplethysmogram (PPG) sensor, a pulse oximeter, a biometric sensor (e.g., a fingerprint sensor), or other types of sensing device.

In some embodiments, the electronic device 1400 includes one or more output devices 1404 configured to provide output to a user. The output device 1404 may include a display 1408 that renders visual information generated by the processor 1406. The output device 1404 may also include one or more speakers to provide audio output. The output device 1404 may also include one or more haptic devices that are configured to produce a haptic or tactile output along an exterior surface of the device 1400.

The display 1408 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1408 is a liquid-crystal display or an electrophoretic ink display, the display 1408 may also include a backlight component that can be controlled to provide variable levels of display brightness. If the display 1408 is an organic light-emitting diode or an organic electroluminescent-type display, the brightness of the display 1408 may be controlled by modifying the electrical signals that are provided to display elements. In addition, information regarding configuration and/or orientation of the electronic device may be used to control the output of the display as described with respect to input devices 1418. In some cases, the display is integrated with a touch and/or force sensor in order to detect touches and/or forces applied along an exterior surface of the device 1400.

The electronic device 1400 may also include a communication port 1412 that is configured to transmit and/or receive signals or electrical communication from an external or separate device. The communication port 1412 may be configured to couple to an external device via a cable, adaptor, or other type of electrical connector. In some embodiments, the communication port 1412 may be used to couple the electronic device 1400 to a host computer.

The electronic device 1400 may also include at least one accessory 1416, such as a camera, a flash for the camera, or other such device. The camera may be part of a camera assembly that may be connected to other parts of the electronic device 1400 such as the control circuitry 1410.

As used herein, the terms "about," "approximately," "substantially," "generally," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

As used herein, the phrase "one or more of" preceding a series of items, with the term "and" or "or" to separate any of the items, modifies the list as a whole, rather than each member of the list. The phrase "one or more of" does not require selection of at least one of each item listed; rather, the phrase allows a meaning that includes at a minimum one of any of the items, and/or at a minimum one of any combination of the items, and/or at a minimum one of each of the items. By way of example, the phrases "one or more of A, B, and C" or "one or more of A, B, or C" each refer to only A, only B, or only C; any combination of A, B, and C; and/or one or more of each of A, B, and C. In addition, as used herein the phrase "one or more of" preceding a series of items, with the term "and" or "or" separating the items, does not require selection of one of each item listed; rather, the phrase allows a meaning that includes at a minimum one of any of the items, and/or at a minimum one of any combination of the items, and/or at a minimum one of each of the items. Similarly, it may be appreciated that an order of elements presented for a conjunctive or disjunctive list provided herein should not be construed as limiting the disclosure to only that order provided.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
   a display; and
   an enclosure comprising:
      a transparent component provided over the display, the transparent component comprising a front surface, a rear surface, and an edge surface extending between the front surface and the rear surface, the edge surface defining multiple facets and a surface texture comprising:

a set of recessed features having a characteristic feature size from 25 nm to less than 1 micron; and a set of lateral features, at least some of the recessed features of the set of recessed features overlapping lateral features of the set of lateral features; and an enclosure component coupled to the transparent component and at least partly defining an internal cavity of the electronic device, the display positioned at least partially within the internal cavity.

2. The electronic device of claim 1, wherein a spacing of adjacent lateral features of the set of lateral features ranges from 10 microns to 40 microns.

3. The electronic device of claim 1, wherein:
the front surface defines a perimeter of the transparent component; and
the lateral features of the set of lateral features are aligned with the perimeter.

4. The electronic device of claim 1, wherein the characteristic feature size is a diameter of the set of recessed features.

5. The electronic device of claim 4, wherein a spacing of adjacent lateral features of the set of lateral features is larger than the diameter of at least one of the recessed features of the set of recessed features.

6. The electronic device of claim 1, wherein the transparent component is a glass ceramic component.

7. An electronic device comprising:
a display; and
an enclosure comprising:
a transparent component provided over the display, the transparent component defining:
a front surface, a rear surface, and an edge surface extending between the front surface and the rear surface, the edge surface defining multiple facets and a surface texture comprising recessed features having a characteristic feature size from 25 nm to less than 1 micron;
a corner region; and
an array of holes positioned in the corner region; and
an enclosure component coupled to the transparent component and at least partly defining an internal cavity of the electronic device, the display positioned at least partially within the internal cavity.

8. The electronic device of claim 7, wherein the array of holes is offset from a perimeter of the front surface of the transparent component.

9. The electronic device of claim 8, wherein the transparent component is formed from a glass material.

10. The electronic device of claim 9, wherein the array of holes is filled with a transparent material having an index of refraction that is substantially matched to the glass material.

11. The electronic device of claim 7, wherein:
the surface texture further comprises a set of lateral features; and
at least some of the recessed features are intermixed with lateral features of the set of lateral features.

12. The electronic device of claim 7, wherein each of the holes of the array of holes has a diameter less than 1 mm.

13. The electronic device of claim 12, wherein the diameter of at least one of the holes of the array of holes ranges from 2 micrometers to 500 micrometers.

14. An electronic device comprising:
an enclosure comprising:
a housing; and
a transparent component coupled to the housing and defining an exterior surface, an interior surface, and a shaped edge surface extending between the exterior and the interior surfaces and defining a surface texture, the surface texture comprising:
a set of lateral features; and
a set of recessed features having a characteristic feature size from 25 nm to less than 1 micron, at least some of the recessed features of the set of recessed features interspersed with lateral features of the set of lateral features; and
a display positioned at least partially within an interior cavity defined by the housing.

15. The electronic device of claim 14, wherein:
the shaped edge surface defines a facet; and
the surface texture extends over the facet.

16. The electronic device of claim 15, wherein:
the housing defines a side surface of the electronic device; and
the shaped edge surface is positioned within the interior cavity.

17. The electronic device of claim 15, wherein the transparent component is formed from a chemically strengthened glass.

18. The electronic device of claim 15, wherein the transparent component is formed from sapphire.

19. The electronic device of claim 14, wherein the shaped edge surface defines a curve.

20. The electronic device of claim 14, wherein:
the exterior surface defines a perimeter of the transparent component; and
the transparent component further defines an array of holes offset from a corner region of the perimeter.

* * * * *